(12) United States Patent
Moning et al.

(10) Patent No.: US 12,737,783 B1
(45) Date of Patent: Sep. 15, 2026

(54) CIRCUIT-BASED TRANSACTION WITH SECURE-ACCESS PROCESSING

(71) Applicant: U.S. Bank National Association, Cincinnati, OH (US)

(72) Inventors: Todd C. Moning, Victoria, MN (US); Valerie Felice Lancelle, Caledonia, WI (US); Giacomo Domeniconi, Long Island City, NY (US)

(73) Assignee: U.S. Bank National Association, Minneapolis, MN (US)

(*) Notice: Subject to any disclaimer, the term of this patent is extended or adjusted under 35 U.S.C. 154(b) by 0 days.

(21) Appl. No.: 18/199,265

(22) Filed: May 18, 2023

Related U.S. Application Data

(60) Provisional application No. 63/443,143, filed on Feb. 3, 2023.

(51) Int. Cl.
*G06Q 30/0238* (2023.01)
*G06Q 10/04* (2023.01)
(Continued)

(52) U.S. Cl.
CPC ......... *G06Q 30/0238* (2013.01); *G06Q 10/04* (2013.01); *G06Q 20/20* (2013.01);
(Continued)

(58) Field of Classification Search
CPC .... G06Q 30/0238; G06Q 10/04; G06Q 20/20; G06Q 20/4014; G06Q 30/0219; G06Q 30/0224
See application file for complete search history.

(56) References Cited

U.S. PATENT DOCUMENTS 5,859,419 A 1/1999 Wynn
9,092,767 B1 * 7/2015 Andrews ............. G06Q 10/067
(Continued)

FOREIGN PATENT DOCUMENTS

WO 2017/218145 A1 12/2017

OTHER PUBLICATIONS

Rajaji, Shanthi & V, Nivetha & S, Vigna. (Mar. 2018). Multi Bank Smart Card. International Journal of Innovations & Advancement in Computer Science, 9 pages.
(Continued)

*Primary Examiner* — Waseem Ashraf
(74) *Attorney, Agent, or Firm* — Alston & Bird LLP

(57) ABSTRACT

In certain specific examples, aspects are directed to methods and systems involving selection and processing circuitry involving multiple transaction-directed user accounts registered by a service provider (e.g., banking or other type of financial institution) and with the selection and processing circuitry configured to enable selection of one of the accounts, based on an optimization algorithm which accounts for the rewards offerings. The recommended and/or selected one of the reward-type transaction accounts may realize a maximum level of value, according to user-specific criteria, for a particular prospective purchase transaction, and the transaction may be being carried out via a secure protocol that is to mitigate or prevent unauthorized use of the VTC circuit and that is in compliance with a secure protocol associated with the selected one of the reward-type transaction accounts.

32 Claims, 9 Drawing Sheets

(51) Int. Cl.
*G06Q 20/20* (2012.01)
*G06Q 20/40* (2012.01)
*G06Q 30/0207* (2023.01)

(52) U.S. Cl.
CPC ..... *G06Q 20/4014* (2013.01); *G06Q 30/0219* (2013.01); *G06Q 30/0224* (2013.01)

(56) References Cited

U.S. PATENT DOCUMENTS

| | | | | |
|---|---|---|---|---|
| 9,147,184 | B2 | 9/2015 | Dickelman | |
| 9,251,510 | B2 | 2/2016 | Dickelman | |
| 9,367,834 | B2 | 6/2016 | Morgan et al. | |
| 9,367,839 | B2 | 6/2016 | Dickelman | |
| 9,424,562 | B2 | 8/2016 | Dickelman | |
| 9,881,131 | B1 | 1/2018 | Dickelman | |
| 9,922,321 | B2 | 3/2018 | Aaron et al. | |
| 10,339,520 | B2 | 7/2019 | Wyatt | |
| 10,769,602 | B2 | 9/2020 | Kang | |
| 10,861,007 | B2 | 12/2020 | Dogin et al. | |
| 11,087,349 | B1 * | 8/2021 | Bowman | G06Q 20/407 |
| 11,507,930 | B1 | 11/2022 | Pickelman | |
| 11,562,389 | B2 * | 1/2023 | Corrieri | G06Q 20/12 |
| 12,182,832 | B2 * | 12/2024 | Harmer | G06Q 30/0215 |
| 2005/0071225 | A1 | 3/2005 | Bortolin et al. | |
| 2005/0071227 | A1 | 3/2005 | Hammad et al. | |
| 2005/0074126 | A1 | 4/2005 | Stanko | |
| 2005/0125343 | A1 | 6/2005 | Mendelovich | |
| 2005/0154924 | A1 * | 7/2005 | Scheidt | G06Q 20/3674 726/19 |
| 2006/0208060 | A1 * | 9/2006 | Mendelovich | G06Q 30/0236 235/379 |
| 2006/0208064 | A1 | 9/2006 | Mendelovich et al. | |
| 2007/0055597 | A1 | 3/2007 | Patel et al. | |
| 2008/0017720 | A1 | 1/2008 | Kranzley | |
| 2009/0048884 | A1 | 2/2009 | Olives et al. | |
| 2009/0112766 | A1 | 4/2009 | Hammad et al. | |
| 2010/0211445 | A1 | 8/2010 | Bodington | |
| 2011/0302011 | A1 | 12/2011 | Yoder et al. | |
| 2012/0109730 | A1 | 5/2012 | Yoder et al. | |
| 2013/0024371 | A1 * | 1/2013 | Hariramani | G06Q 20/384 705/41 |
| 2013/0238434 | A1 | 9/2013 | Green | |
| 2013/0262291 | A1 | 10/2013 | Ricci | |
| 2014/0074575 | A1 | 3/2014 | Rappoport | |
| 2014/0304073 | A1 * | 10/2014 | Fisher | G06Q 20/3227 705/14.66 |
| 2016/0192123 | A1 | 6/2016 | Lim | |
| 2016/0225011 | A1 | 8/2016 | Shah et al. | |
| 2016/0307196 | A1 | 10/2016 | Achhra et al. | |
| 2016/0328698 | A1 * | 11/2016 | Kumaraguruparan | H04W 4/029 |
| 2018/0165729 | A1 * | 6/2018 | Dickelman | G06Q 20/20 |
| 2018/0278600 | A1 * | 9/2018 | Eleish | H04L 63/06 |
| 2020/0065783 | A1 | 2/2020 | Fernandes et al. | |
| 2020/0193470 | A1 * | 6/2020 | Chatterjee | G06Q 30/0226 |
| 2021/0272100 | A1 | 9/2021 | Crough | |
| 2022/0270168 | A1 | 8/2022 | Daya et al. | |
| 2023/0196374 | A1 * | 6/2023 | Singh | G06Q 20/4093 705/44 |
| 2023/0297826 | A1 * | 9/2023 | Shaju | G06N 3/08 706/25 |
| 2023/0401304 | A1 | 12/2023 | Abdou et al. | |
| 2024/0029038 | A1 | 1/2024 | Martinson | |
| 2026/0094181 | A1 * | 4/2026 | Moning | G06Q 30/0238 |

OTHER PUBLICATIONS

Harshal M. Bajad, Sandeep E. Deshmukh, Pradnya R. Chaugule, Mayur S. Tambade, 2012, Universal ATM Card System, International Journal of Engineering Research & Technology (IJERT) vol. 01, Issue 08 (Oct. 2012), 4 pages.

Curve US Inc. www.curve.com/en-us/how-it-works/ (copyright 2023), website printout, 10 pages.

Chalmers Brown. The Best Digital Wallets (updated May 11, 2022). https://due.com/best-digital-wallets/, website printout, 7 pages.

Danny Thankkar. Fingerprint Match on Card: Smart Cards Meet Biometrics for Identification and Access Control. Bayometric (2022), 7 pgs. www.bayometric.com/fingerprint-match-on-card-smart-cards-meet-biometrics-for-identification-and-access-control.

Ivana Pino, "Americans carry 4 credit cards on average. Here's how many you should have, according the experts," Fortune, 3 pages, (Oct. 4, 2022). [Retrieved from the Internet Jun. 11, 2024: URL: <https://web.archive.org/web/20230125141510/https://fortune.com/recommends/article/how-many-credit-cards-should-i-have/>].

* cited by examiner

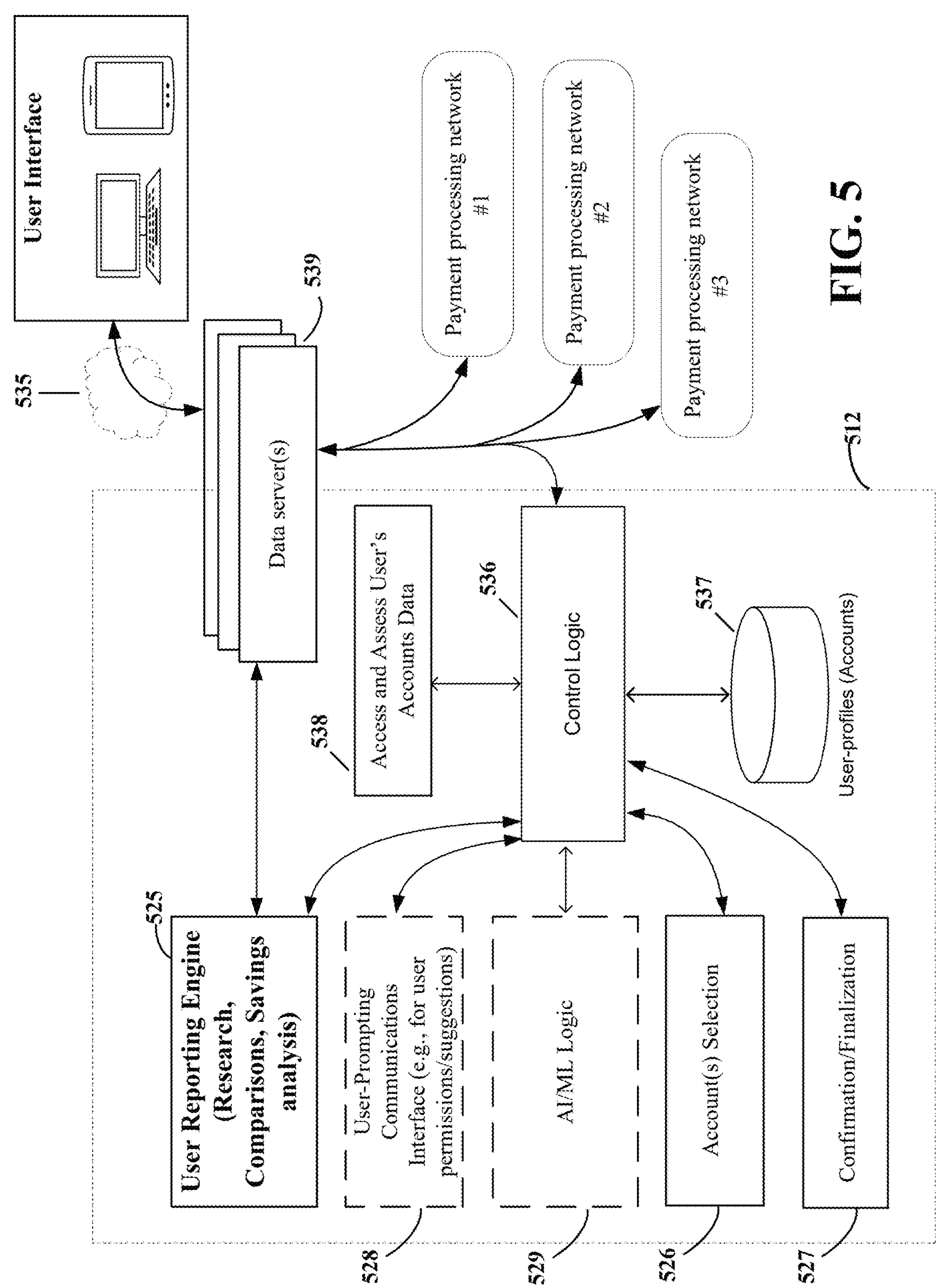
User Interface
535
539
Payment processing network #1
Payment processing network #2
Payment processing network #3
FIG. 5
512
Data server(s)
Access and Assess User's Accounts Data
538
536
Control Logic
537
User-profiles (Accounts)
525
User Reporting Engine (Research, Comparisons, Savings analysis)
User-Prompting Communications Interface (e.g., for user permissions/suggestions)
AI/ML Logic
Account(s) Selection
Confirmation/Finalization
528
529
526
527

CIRCUIT-BASED TRANSACTION WITH SECURE-ACCESS PROCESSING

Aspects of various embodiments are directed to circuits for effecting secure access to personalized online accounts with sensitive data including but not limited to healthcare accounts and financial-asset accounts such as bank accounts and other accounts involving user-based data electronic transactions which may be carried out.

The rate of increase in the amount and types of uses of sensitive user data generated and collected in today's digital society continues to escalate. For example, online computers and mobile devices (e.g., smartphones and smartcards) provide increasing capabilities and convenience to enable users to communicate with third parties and to provide sensitive data as may be needed to carry out many types of transactions involving and/or relying on third party organizations. Such transactions may include services such as obtaining healthcare information customized to users' private health history, and accessing government-provided benefits based on users' confidential identification data (driver's-license, social-security and passport numbers, a variety of financial transactions, user-customized questions and answers for logging into accounts, etc.). However, the widespread use of sensitive personal data also increases the difficulty of supporting maintenance of such data for conveniently effecting transactions in a secure way, particularly as such data has become used as a type of tradable asset class As more sensitive user data is stored by private and governmental organizations with each passing year, criminals and even legitimate companies have become increasingly skilled at retrieving and commercially exploiting such information, and conflating or concealing evidence of their unauthorized uses. With regards to this type of asset class being tradable, as reports of secure data breaches by both data hackers and apparent misrepresentations of third-party continue, many users consider even permissible third-party access to this data with suspicion, and recognize even minimal use of such data as possible intrusions of privacy. There has also been significant evidence that improper use of such data has led to significant burdens, for example, to buyers, sellers, providers of services using transaction payment processing platforms, and to service providers (e.g., personnel in accounting, marketing, etc.) who are required to track the transactions.

Tensions between securely maintaining the private control of sensitive user data and providing convenient authorized access and use of such data are issues whose importance is continuing to grow. Notwithstanding less convenient steps for users to access their data, recent years have seen significant steps toward tightening and restricting access to such user data that is held by third-party organizations, for example, personal-identity data, financial account data and/or medical information. For instance, state and federal laws increasingly require businesses to implement heightened data security protocols and to provide notices to individuals in response to actual or potential security breaches. These obligations have become onerous for businesses, and data management costs are a burgeoning concern for IT professionals and executives and consequently, the third-party organizations have made user access to this data increasing complex.

Conventional methods for protecting data in a secure storage environment are inadequate for minimizing modern data management risks and associated costs. For example, conventional permission-based access protocols for protecting secure data may fail to provide precise and controlled data flow and presentation of data, leading to increased organizational costs in connection with data breach mitigation and notification efforts, and may continue to result in unduly burdensome complexities for users who would be otherwise interested in sharing their sensitive data in order to gain access to additional services, transactions and opportunities offered by third-party organizations.

Accordingly, there are needs to provide devices, systems and related methodologies which are safe and convenient and which provide convenience and economic benefit to individual users and a wide variety of business entities involved with such transaction data. On a larger scale, there are needs to provide systems and digital-communications systems and their devices to improve national and local economic interests and to effect day-to-day transactions securely.

SUMMARY

Various example embodiments are directed to issues such as those addressed above and/or others which may become apparent from the following disclosure concerning use of a secure user circuit-based card or device which is configurable, through a secure protocol, by a remote back-end CPU-processing circuit for implementing operations of the card or device according to a user-preferred payment-medium based on an automated selection process. Other non-limiting examples in the form of embodiments, aspects, features, etc. of the present disclosure are characterized below in this Summary section, in connection with figures and their discussion, and by way of the Detailed Description and claims sections below.

In certain specific example embodiments, aspects of the present disclosure are directed to methods, and systems for facilitating such methods, involving a user holding multiple transaction-directed accounts represented by a smartcard which is registered by a financial (e.g., banking) institution's CPU system with the smartcard and the CPU system cooperatively configured to enable selection, based on an optimization algorithm which accounts for the rewards offerings. The recommended and/or selected one of the reward-type transaction accounts may realize a maximum and/or preferred level of rewards, according to user-specific criteria, for a particular prospective purchase transaction, and the transaction may be being carried out via a secure protocol that is to mitigate or prevent unauthorized use of the front-end (user) equipment and that is in compliance with a secure protocol associated with the selected one of the transaction accounts.

As another example, consistent with specific examples disclosed herein, a method and/or apparatus may be directed to or involving: processing purchase transaction data for a transaction involving a POS (point-of-sale) terminal and involving user equipment (e.g., a unified electronic transaction device or card) which includes an ID or code and may be used to represent any of multiple transaction accounts; and by using information corresponding to the multiple rewards-based transaction accounts (e.g., transaction accounts providing rewards and/or benefits to the user or other designee), selecting or recommending, based at least partly on assessment of status rewards data and on purchase transaction data and to realize a preferred use and/or optimized selection for certain maximization of the associated rewards, one of the plurality of (reward-type) transaction accounts is chosen for use in connection with the transaction and/or for causing a change in status rewards data for the selected one of the plurality of transaction accounts. In response to the user confirming that the POS-related transaction should be completed (e.g., by permitting payment by way of one or more of use of funds from the accounts (whether or not recommended and in certain examples by using rewards points alone or with such funds), a change in status rewards data may be effect if appropriate, such as for the selected one of the plurality of transaction accounts being applied According to other certain specific examples, front-end (user) equipment communicates data over a network in connection with a prospective purchase via a point-of-sale terminal (e.g., operated on behalf of a merchant, operated by an end-user on their CPU-based device such as a buyer pushing a payment or reacting to a requested payment, and/or an end user's smartphone operating to accept a payment). In connection with the prospective purchase, a back-end (CPU-processing) circuitry may receive transaction data including transaction account identification data and information about the sale and, after assessing various data (relative to certain rewards available to the user), the circuitry then processes and in some instances also accepts authorized user-input data (e.g., via a GUI) linked to the transaction account/holder) to select an ideal one of the rewards-based (or reward-type) transaction accounts. Such circuitry, which in some instances may include artificial-intelligence and/or machine-learning (AI/ML), may access and assess various types of data (e.g., the user's prior purchases, one or more additional (e.g., third-party) rewards offerings) which may be used for or otherwise applicable to the transaction. The circuitry may use this data (in whole or part) to recommend and/or effect payment for the transaction (e.g., the latter being without further involvement or use of further security protocols involving the user). In certain specific examples, the transaction account identification data can correspond to at least one of: be one or more actual or disguised transaction account indicators indicative of at least the user/holder of the rewards-based transaction accounts, and one or more of the rewards-based transaction accounts.

Other exemplary aspects are directed to such a back-end processing circuit that analyzes past purchases made by the user or simulates future purchases (e.g., provided by a simulator modeling such purchases made by different transaction cards) and, in response, generates suggestions for the user (or for the AI/ML engine used by the back-end processing circuit) on how the user's rewards-based transaction cards/accounts could be or could have been improved by use of a different selection and/or by use of new transaction card available to the user. Further, based on these suggestions, the user may sign up for such a new transaction card (e.g., and register it with the user's profile in a database of the back-end processing circuit) and/or, via the back-end processing circuit or the user, weighting may be provided to certain transactions over a period of time or certain types of transaction in order to optimize the rewards associated with purchases made using appropriately selected ones of the transaction cards.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawing according to examples of the present disclosure, with the drawing including:

FIG. 5 is another system-type block diagram illustrating another example system, also according to certain examples of the present disclosure;

Figures 1, 2:
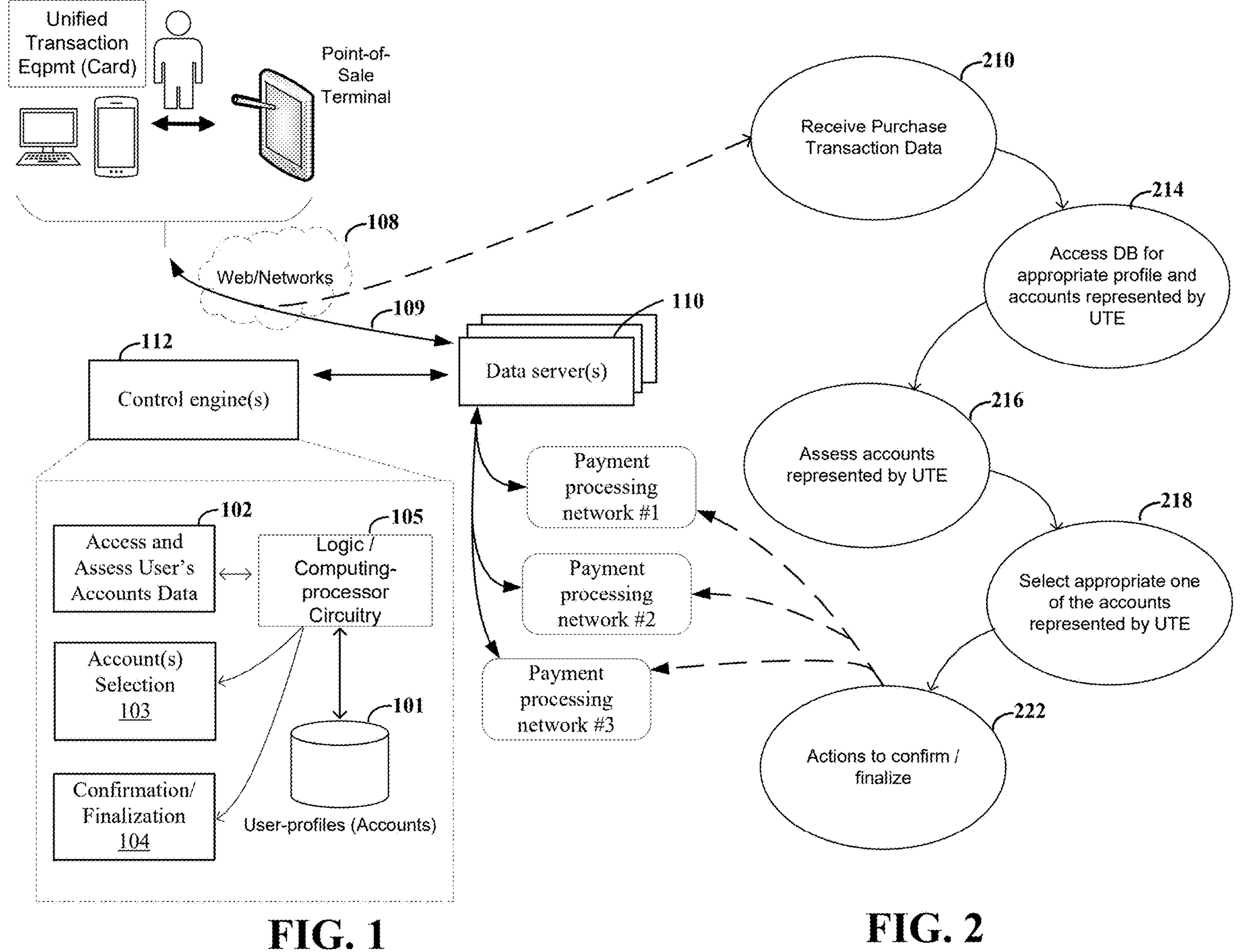
FIG. 1 is a system-type block diagram illustrating an example system, according to certain examples of the present disclosure.
FIG. 2 is an example flow diagram for a system, such as shown in connection with FIG. 1, and useful for illustrating one of various examples of how data for such transaction may be processed in accordance with certain examples of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to any of a variety of different types of apparatuses (etc., systems, devices, components) and methods involving a computing processor circuit communicatively coupled to or integrated with the communication circuits and security-verification engines to access a database that stores or references a user-specific profile with user-specific criteria for using a plurality of reward-based transaction accounts and that stores or references a plurality of reward-type transaction accounts represented by a unified electronic transaction device, such as a smartcard. In certain implementations, aspects of the present disclosure have been shown to be beneficial when used in the context of a user holding multiple credit card accounts linked to and/or represented by a smartcard, or other user equipment, which is registered by a financial (e.g., banking) institution's CPU system with the smartcard and the CPU system cooperatively configured to enable selection, based on an optimization algorithm which accounts for the rewards offerings, of one of the plurality of reward-type transaction accounts that would ideally realize a maximum level of value (e.g., maximizing rewards, minimizing rewards-redemption prices, minimizing interest expense, etc.), according to user-specific criteria, for a particular prospective purchase transaction. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well-known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In certain specific example embodiments, aspects of the present disclosure are directed to methods, and systems for facilitating such methods, involving a user holding multiple transaction-directed accounts represented by a smartcard which is registered by a financial (e.g., banking) institution's CPU system with the smartcard and the CPU system cooperatively configured to enable selection, based on an optimization algorithm which accounts for the rewards offerings. The recommended and/or selected one of the reward-type transaction accounts may realize a maximum and/or preferred level of rewards, according to user-specific criteria, for a particular prospective purchase transaction, and the transaction may be being carried out via a secure protocol that is to mitigate or prevent unauthorized use of the front-end (user) equipment and that is in compliance with a secure protocol associated with the selected one of the transaction accounts.

As another example, consistent with specific examples disclosed herein, a method and/or apparatus may be directed to or involving: processing purchase transaction data for a transaction involving a POS (point-of-sale) terminal and involving user equipment (e.g., a unified electronic transaction device or card) which includes an ID or code and may be used to represent any of multiple transaction accounts; and by using information corresponding to the multiple rewards-based transaction accounts (e.g., transaction accounts providing rewards and/or benefits to the user or other designee), selecting or recommending, based at least partly on assessment of status rewards data and on purchase transaction data and to realize a preferred use and/or optimized selection for certain maximization of the associated rewards, one of the plurality of reward-type transaction accounts is chosen for use in connection with the transaction and/or for causing a change in status rewards data for the selected one of the plurality of reward-type transaction accounts. In response to the user confirming that the POS-related transaction should be completed (e.g., by permitting payment by way of one or more of use of funds from the accounts (whether or not recommended and in certain examples by using rewards points alone or with such funds), a change in status rewards data may be effected if appropriate, such as for the selected one of the plurality of reward-type transaction accounts being applied. In connection with the above and other specific examples according to the present disclosure, it will be appreciate that one or more of the reward-type transaction accounts need not be hosted by the provider at the backend circuitry; this follows as in certain specific embodiments, computer processing circuitry (such as the backend circuitry which is communicatively coupled to the user equipment) may operate to educate the user (e.g., by providing the user with data via the equipment such as in the form of suggestions) on which of the transaction accounts or transaction cards would provide maximum value if used for a given set of one or more (types of) purchase transaction.

Also according to other certain specific examples, front-end (user) equipment communicates data over a network in connection with a prospective purchase via a point-of-sale terminal (e.g., operated on behalf of a merchant and/or as above). In connection with the prospective purchase, a back-end (CPU-processing) circuitry may receive transaction data including transaction account identification data and information about the sale and, after assessing various data (relative to certain rewards available to the user), the circuitry then processes and in some instances also accepts authorized user-input data (e.g., via a GUI) linked to the transaction account/holder) to select an ideal one of the rewards-based transaction accounts. Such circuitry, which in some instances may include artificial-intelligence and/or machine-learning (AI/ML), may access and assess various types of data (e.g., the user's prior purchases, one or more additional (e.g., third-party) rewards offerings) which may be used for or otherwise applicable to the transaction. The circuitry may use this data (in whole or part) to recommend and/or effect payment for the transaction (e.g., the latter being without further involvement or use of further security protocols involving the user). In certain specific examples, the transaction account identification data can correspond to at least one of: be one or more actual or disguised transaction account indicators indicative of at least the user/holder of the rewards-based transaction accounts, and one or more of the rewards-based transaction accounts.

In one type of example embodiment, the present disclosure is directed to a transaction-account recommendation system having a backend circuit communicatively coupled to at least one database storing data in a profile in which processing circuitry of the backend circuitry is to store user preferences with prioritization criteria for the such transactions for selecting certain of the respective ones of the plurality of payment mediums. The processing circuitry is to update, in response to preference information received from the user, data concerning which of the respective ones of the plurality of payment mediums to use for different categories of transactions including purchase transactions. Further, the processing circuitry is to update: the user profile in response to user-provided specifications or criteria identifying the different categories relevant to the respective ones of the plurality of payment mediums to use; the user profile in response to the user indicating specific goals or limited-time promotions concerning use of the respective ones of the plurality of payment mediums; and/or the user profile in response to the user indicating a choice to maximize rewards or benefits through use of the respective ones of the plurality of payment mediums.

In certain example embodiments, aspects of the present disclosure are directed to a system including a server operating with a computing processor circuit and which may include an AI/ML engine. The server is to receive purchase transaction data, over at least one communications network, for a prospective transaction involving a POS terminal and involving a unified electronic transaction device that is associated with a user of the unified electronic transaction device and with an accumulation of rewards in response to use of the unified electronic transaction device. The computing processor circuit is to access a database that stores or references a user-specific profile with user-specific criteria for using the plurality of reward-type transaction accounts and that stores or references a plurality of reward-type transaction accounts represented by the unified electronic transaction device. The computing processor circuit may also use an AI/ML algorithm to assess rewards offerings linked to status rewards data of the reward-type transaction accounts and in a more specific example, the computer processing circuit is to assess all (e.g., relevant) rewards data and/or user preferences to suggest to the user and, in some instances for which the system is configured, also to select the recommendation on behalf of the user and thereby implement the best option.

In more specific examples, the assessment may be based on at least one of: the received purchase transaction data for the prospective transaction including data that corresponds to the user-specific criteria qualifying the prospective transaction for using a particular one of the plurality of reward-type transaction accounts; a rewards-threshold goal to be applied to at least one of the plurality of reward-type transaction accounts; and an optimization algorithm that is to recommend or select one of the plurality of reward-type transaction accounts as a function of a rewards-maximization goal. Further, the computing processor circuit may select on behalf of the user, based on the assessment of the rewards offerings and subject to satisfying the user-specific criteria of the user-specific profile, one of the plurality of reward-type transaction accounts as a recommended one to complete the prospective transaction; and cause data to be sent over the at least one broadband network to authorize the transaction at the POS terminal and a change in status rewards data for the selected one of the plurality of reward-type transaction accounts.

In another specific example embodiment which builds on certain of the above aspects, after the purchase is completed at the POS, the backend circuitry continues to assess and attempts to optimize benefit to the user such as maximize the value of a selected user transaction account. In certain instances, such post-purchase assessment yields a recommendation that it would have been better to use a different transaction account/card than was used to complete the purchase (e.g., given rule changes or new information gathered regarding rewards programs), and yields prompts (e.g., via a user interface) to switch the cards for the previous transaction. Such actions may be, for example, detected by the user, and/or in response to prompting by the front-end circuit and/or the backend circuit (such as an AI/ML) or by a third-party server communicatively coupled to the front-end circuit and/or the backend circuit. Non-limiting examples in this context include making a return on one card and effecting a repurchase of the offering on another account (e.g., in response to detecting a lessor price being available for the item and/or a better rewards opportunity), and paying off the previous card with use of another card which would accumulate more points or rewards. Alternatively, this process may effect a return and repurchase with the different card/account or new card/account, or by transferring rewards from the initially selected account (as selected before the transaction was completed) to the different card/account or new card/account (after the transaction was completed).

Consistent with the above aspects, the back-end system could (within user or system approved parameters), after a purchase transaction, cause the purchase transaction to be financially unwound and redone to effectuate that improved alternative reward value. In more specific examples, unlike previous implementations in which a return may be processed on the same transaction card and/or account and with an immediate purchase on a different card/account, consistent with aspects of the immediately-preceding feature or aspects, the back-end system can be enabled to perform such an unwinding of the purchase transaction with the front-end system of the merchant.

In yet further specific example embodiments (e.g., building on one or more of the above examples), the user-specific criteria for using the plurality of reward-type transaction accounts includes at least one of: user-selected rewards-priority criteria for selection of one or more of the plurality of reward-type transaction accounts; user-specified transaction-type criteria corresponding to the received purchase transaction data for the prospective transaction; special user authorization to be provided by the user before proceeding with the prospective transaction (e.g., authorization via 2- or 3-factor approval for user confirmation of a recommended or suggested (e.g., "whispered" selection); and user-specific historical data relating to one of: data obtained from previous purchase transactions, previous use of one or more of the plurality of reward-type transaction accounts, and other data indicative of one or more user-specific events (e.g., scheduled and/or previous whether on a personal or business calendar for selecting a business or personal card, record of the user calling in to report expected travel, any type of indication of the user currently or previously traveling, delivery of purchases not being acknowledged, and the user having indicated possible misuse of one of the reward-type transaction accounts). In a more-specific example wherein a computing processor circuit uses AI/ML, the circuit may execute one or more AI/ML algorithms to review and assess the above-listed aspects to study the user's transaction histories and the other stored data for making an appropriate recommendation and/or selection based on the recommendation.

In another specific example embodiment, the present disclosure is directed to a system (e.g., cooperating set of data-processing CPU-based circuits) including a server and a computing processor circuit. The server is to receive purchase transaction data, over at least one communications network, for a transaction involving a POS terminal and involving a unified electronic transaction device. The computing processor circuit is to: access a database having a user-specific profile that includes or references a plurality of reward-type transaction accounts (e.g., as one or more accounts linked to one or more bank accounts) represented by the unified electronic transaction device; assess status rewards data of the plurality of reward-type transaction accounts; select, based at least partly on the assessed status rewards data and in response to the received purchase transaction data, one of the plurality of reward-type transaction accounts; and cause data to be sent over the at least one broadband network to authorize the transaction at the POS terminal and cause a change in status rewards data for the selected one of the plurality of reward-type transaction accounts. For example, the data caused to be sent in this manner may be in response to login credentials for use of the selected one of the plurality of reward-type transaction accounts.

Building on one or more of the above systems, there are a number of additional aspects or features, one or more of which may be combined with such a system or method. These additional aspects or features may include one or more of the following. The computing processor circuit may select the one of the plurality of reward-type transaction accounts based on the assessment indicating that the selected one is to realize a rewards threshold. The selected one of the plurality of reward-type transaction accounts may be: selected to maximize or optimize rewards across the plurality of reward-type transaction accounts; and/or based on data, received from the POS terminal, indicating a type or category of the transaction. The computing processor circuit may receive confirmation data from a user-communication device linked to an authorized user of the selected one of the plurality of reward-type transaction accounts, before the action of causing data to be sent to authorize the transaction and causing a change in status rewards data. The computing processor circuit is to select the one of the plurality of reward-type transaction accounts based on data, received from the POS terminal, indicating that the type of the transaction corresponds to one, and not the other, of: a business purchase and a personal purchase. The computing processor circuit may select the one based on data, received from the POS terminal, indicating that the type of the transaction corresponds to a type of purchase indicated in the user-specific profile as being a permitted type of purchase. The server and the computing processor circuit may cooperatively operate to gather data from at least one third-party server to detect rewards opportunities linked to at least one of the plurality of reward-type transaction accounts. The computing processor circuit may also maintain the user-specific profile based on changes to the plurality of reward-type transaction accounts, and/or may use access credentials to monitor use-related aspects of the plurality of reward-type transaction accounts. Further, the reward-type transaction accounts may be serviced on behalf of one or more third parties (e.g., VISA) independent of an entity (e.g., US Bank) for which the computing processor circuit is to be operated, or serviced on behalf of an entity for which the computing processor circuit is to be operated (e.g., US Bank).

Also building on one or more of the above systems, aspects or features, yet further aspects or features (one or more of) which may be combined with such a system or method, and these are listed below. The purchase transaction data (e.g., involving a POS terminal) may include identification authorization data for use by the unified electronic transaction device, and the computing processor circuit is to then use the identification authorization data for the login credentials, and/or may include identification authorization data for use by the unified electronic transaction device that is distinct from the login credentials. The unified electronic transaction device may include distinct identification data and may be enabled for conveying the distinct identification data to at least one of the POS terminal and the server, and the unified electronic transaction device refers to, includes or is integrated with at least one of: a smart card; a personal computer; and a portable user device. Also, the computing processor circuit may be operated on behalf of a bank (as alternative to another type of entity issuing and/or operating the computing processor circuit, which is also consistent with the present disclosure) at which an owner or user of the unified electronic transaction card (and/or account) is registered, and at least one of the plurality of reward-type transaction accounts may be linked to a bank or other financial account.

Figure 4:
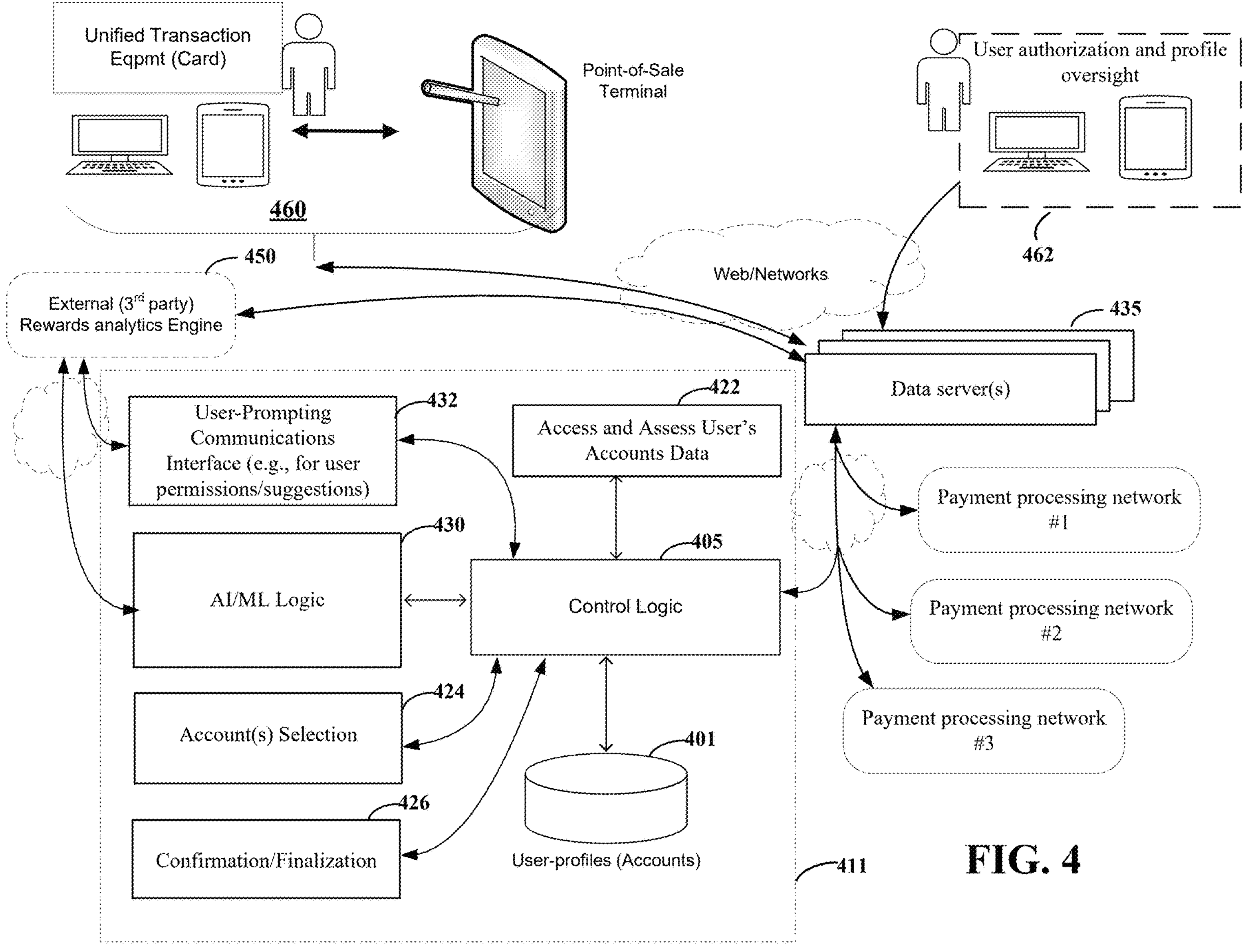
FIG. 4 is another system-type block diagram illustrating another example system, also according to certain examples of the present disclosure.

In such systems according to the present disclosure, the computing processor circuit may include or be communicatively coupled with an AI/ML engine (artificial-intelligence or machine-learning engine) programmed to assess the status rewards data of the plurality of reward-type transaction accounts, the AI/ML engine that is to access and assess one or more additional (e.g., third-party) rewards offerings for transaction accounts and in response, to select and report, for review by an authorized entity as indicated in the user-specific profile, on one or more of the third-party rewards offerings which the AI/ML engine deems is best aligned with data in, or transactions linked to, the user-specific profile data; for example, this may involve a user suggestion (or whisperer) block (e.g., see 432 of FIG. 4). Also in certain examples, the computing processor circuit includes or is communicatively coupled with a reporting engine that is to provide rewards-specific reporting information in response to a user query which is linked to authorization data indicated in the user-specific profile (see, e.g., reporting block 525 of FIG. 5).

In certain other example embodiments, aspects of the present disclosure are directed to a system including a front-end (user) equipment associated or integrated with user equipment for storing information to represent one or more of the multiple rewards-based transaction accounts (e.g., identifier(s) for which may be stored on a smartcard, data-storing magnetic media, a CPU-based device such as a smartphone, tablet computer, etc.) and a backend circuit including computing-processor circuitry to process transaction data with the front-end equipment. In certain examples, each of the front-end equipment and the backend circuit may be cooperatively configured (e.g., in terms of communication protocols, security assess, etc.) with the types of operations and circuitry as described with the above specific examples.

The processing circuitry of this exemplary backend circuit may include selection-processing circuitry, and memory circuitry including at least one database. The database(s) may be used for storing up-to-date rewards information specific to respective ones of the plurality of payment mediums and information concerning transactions effected by usage of the respective ones of the plurality of payment mediums, and for storing (a) unique identification information linked to the front-end equipment, and (b) user preferences with prioritization criteria for using or configuring the front-end equipment based on a selected one of the plurality of payment mediums. The selection-processing circuitry is to assess and apply the rewards data and the user preferences to the one or more prospective transactions and, in response, to select and send to the front-end equipment an indication of the payment-medium configuration data deemed to optimally satisfy the criteria.

Other specific aspects of the present disclosure are directed to a front-end user equipment which may be used with such a backend circuit and transaction terminal, and/or with the systems and methods previously characterized hereinabove. In this context, an exemplary front-end user equipment may include communication circuitry and a control circuit (and in certain instances, also portable device such as a smartphone which may store identifier(s) useful for initiating a transaction). The control circuit, communicatively integrated with the communication circuitry, is to configure the front-end user equipment according to payment-medium configuration data for representing one or a subset of a plurality of payment mediums and, in response to the front-end user equipment being configured and to communicate selected payment medium data with the transaction terminal. The front-end user equipment/circuitry (e.g., a smartphone and/or a POS (CPU) terminal authorized by the user and/or accounts holder) is to receive from the back-end processing circuit certain data corresponding to or indicating: unique identification information linked to the front-end user equipment; and the payment-medium configuration data for configuration of the front-end user equipment to optimally satisfying previously-provided user preferences and prioritization criteria to obtain rewards based on use of one of the plurality of payment mediums.

Other exemplary aspects are directed to such a back-end processing circuit that analyzes past purchases made by the user or simulates future purchases (e.g., provided by a simulator modeling such purchases made by different transaction cards) and, in response, generates suggestions for the user (or for the AI/ML engine used by the back-end processing circuit) on how the user's rewards-based transaction cards/accounts could be or could have been improved by use of a different selection and/or by use of new transaction card available to the user. Further, based on these suggestions, the user may sign up for such a new transaction card (e.g., and register it with the user's profile in a database of the back-end processing circuit) and/or, via the back-end processing circuit or the user, weighting may be provided to certain transactions over a period of time or certain types of transaction in order to optimize the rewards associated with purchases made using appropriately selected ones of the transaction cards.

Turning now to the drawing, FIG. 1 is a system-type block diagram illustrating an example type of CPU-based system, according to certain examples of the present disclosure. The illustration depicts a user-transaction environment 102 and within the user-transaction environment 102, the system of FIG. 1 is shown including a transaction terminal (e.g., point of sale or POS terminal which may be operated on behalf of a merchant), and front-end user equipment (e.g., unified physical transaction card, unified virtual (digital or electronic) transaction account and/or equipment representing one or more identifiers of the transaction accounts) as one form of user equipment for effecting a prospective transaction.

In various examples, the front-end user equipment can be one or more of a desktop computer, a smartphone, a smartwatch or some other user device having a user interface (e.g., with a graphic user interface and/or interface with non-visual ways of interacting and transacting such as voice, haptics, etc.). In other examples, a unified transaction card can represent multiple transaction cards (e.g., credit card, a debit card, a smartcard, a loyalty card, etc.) and may not have a GUI, and while the unified transaction may involve one or more accounts (e.g., bank accounts, account(s) linked to Zelle, Venmo, PayPal, direct from bank account payments such as POS direct debit, ACH etc.), it may not necessarily involve a physical card. Other examples of unified transactions relevant to certain specific embodiments include blockchain payments, rewards programs, and programs through which an account (e.g., bank or rewards account) offers to pay in points as a type of tender apart from or in addition to fiat payment types. For example, sometimes it is better to pay with points (or with digital or crypto currencies) than with a card or other fiat method, and this may be an assessment conveyed as part of a recommendation by the backend circuit (e.g., indicating for an account that it would be best to use either its fiat payment option to earn rewards or its rewards currency to complete the transaction. As a specific example, using miles to pay for an airline ticket may be better where points are not earned, or using fiat money to pay for the airline ticket where miles are earned (or, for example, using digital currency to pay for a digital asset). In certain examples, the user equipment (e.g., CPU or smartphone) may have access to a database storing the multiple transaction accounts (e.g., stored in portable device such as smart phones or stored in backend circuitry) with multiple transaction accounts such as those described above. If feedback from and/or communication with the user is sought (as in environment 102) and the user equipment (or unified transaction card) does not have a user interface (e.g., a GUI), the feedback and/or communication may be implemented through one or more of the POS terminal and/or the user equipment which includes a user interface (e.g., the user's smartphone). In various specific embodiments, the user-transaction environment 102 may be carried out by a user situated remotely from the POS terminal (e.g., the user shopping online via the user's smartphone or laptop CPU), wherein the POS terminal is a server (alone or in conjunction with CPU-based transaction processing equipment) configured to carry out the transaction on behalf of the merchant.

The system of FIG. 1 also includes a remotely-situated CPU-based backend data processing circuitry, having a set of one or more data servers 110 and a control engine 112 which are cooperatively configured to process transaction-specific data received from the user-transaction environment 102 for effecting and completing prospective transactions which in some instances may involve one of various providers and/or payment processing networks #1, #2 and #3. While the figures may refer to examples involving an external third-party rewards analytics engine, examples according to the present disclosure are not so limited. This follow as one or more of these networks and/or providers may or may not be one or more third-party entities; as non-limiting examples, these may include platforms, networks and the like associated with a loyalty-based rewards system, providers such as VISA, MasterCard, American Express, etc., and a specific type of (e.g., third-party) payment processing network such as a bank which may issue a financial account such as a savings account, checking account or loan account to which the user card/equipment is linked for completing the prospective transaction).

In certain other examples according to the present disclosure, the set of one or more data servers 110 and a control engine 112 may be coupled to the user-transaction environment 102 through a broadband network (e.g., one or more of the Internet, an intranet, cellular telephone infrastructure, satellite communications network, a WiFi network, etc.). For further information regarding processing purchase transaction data (e.g., by or on behalf of a bank entity) by communicating with one or more payment processing networks, reference may be made to U.S. Pat. No. 9,147,184 (Control System Arrangements and Methods for Disparate Network Systems), No. 9,251,510 (Buyer Routing Arrangements And Methods For Disparate Network Systems), and No. 9,424,562 (Profile-Based Arrangements And Methods For Disparate Network Systems), each of which is incorporated by reference in its entirety and for the specific aspects concerning communications with one or more payment processing networks in response to purchase transaction data. In connection with the control engine 112 of FIG. 1 and control engines of other exemplary embodiments (such as disclosed in connection with other figures of the present disclosure), it is appreciated that certain of the modules shown with the control engine may not necessarily be implemented as part of the control engine (e.g., may be optionally accessible by way of one or more secure communication-channel multiple gateways which, in turn, may or may not be controlled by a third party).

FIG. 1 further depicts a broadband communications network by way of the Cloud 108 (e.g., including the Internet) that is bordered by dashed lines. In such a context, the remotely-situated backend circuit is communicatively coupled to the front-end equipment and/or to the transaction terminal via communication channels 109. The communication channels 109 may carry data between the set of one or more data servers 110 and devices in the user-transaction environment 102 in certain pre-defined forms, and communications protocols which are used by to unpack, interpret and validate the authenticity of the sent and received data. The system of FIG. 1 and other types of examples according to the present disclosure also contemplate use of other types of communication networks, non-limiting examples of which include other types of broadband communications network such as cellular, cable, fiber optic and satellite, and other wireless/wired communication networks such as proximity networks and/or mesh networks.

In the example system of FIG. 1, the control engine 112 (e.g., a CPU or separate computer processing circuit) includes a logic circuit 105 (e.g., data processing computer circuit), a module 114 which, for each user involved in a prospective transaction involving an authorized user transaction card, is to access and assess data stored in the accounts of the user and this data may be stored or linked to the user profile as may be stored in a user profile database 101.

The control engine 112 also includes an account(s) selection module 103 and a confirmation-finalization module 104. The account(s) selection module 103 may use information from any of the other modules and/or the user's profile to select one or more of the user's rewards-based accounts for processing the transaction. For example, the user's profile may indicate that for a prospective transaction involving the purchase of gasoline at a certain merchant terminal (e.g., Costco or Super America) as indicated in a set of data received for the transaction, the preferred account for processing the transaction should be a certain card account linked to that specific merchant according to one or more criteria indicated in the user's profile. This preferred account may logically follow given that the gasoline purchases at that particular merchant terminal result in a level of rewards points corresponding to three percent of the overall purchase amount.

In another example, the account(s) selection module 116 may use information from the module 114 to discern that if a certain one of the user's accounts is not used within a certain amount of time, then an opportunity to reach a significant bonus reward would be lost. This information concerning the bonus reward might be determined from one or more of the following: the information may be preloaded into the user's profile by the user or automatically in recognition of the type of transaction card and its benefits; the information may be accessed by another module (e.g., one of the modules within control engine 112 or another non-illustrated module which retrieves regular (or real-time) updates from third-parties regarding benefits linked to the types of cards (e.g., American Express Platinum Card) which the user has in the user's profile. In this situation, the selection module 116 may override the previously-indicated selection to optimize the user's rewards for the current prospective transaction. This so-called "override" may be part of an algorithm through which the various choices are weighted to inform the module 116 on which of the transaction cards or accounts in the user's profile should be selected (or recommended to the user) for selection.

The confirmation-finalization module 117 may assess any of various factors before confirming the selected or recommended transaction card or account from the user's profile and then a set of one or more finalizing steps may be executed so that the prospective transaction can be completed between the user and the merchant represented at the POS terminal. In specific situations, configurations and/or example embodiments, the various factors may include one or more of the following: whether the account(s) selection module 116 has recommended or selected a transaction card or account from the user's profile. If the action is a selection (e.g., which may not require the user to confirm or approve the selection such as from a GUI), then such transaction completion may only involve finalizing by way of protocol-specific communications between the data server (e.g., 110) and the one of the payment processing networks (#1, #2, #3, etc.) corresponding to the transaction card or account. An example of such protocol-specific communications may require the data server to send typical data which might be normally sent from the POS terminal but in this example, the data for the card or account is stored in the user profile (e.g., 16 digit-long number, 4-digit expiration date and 3-digit CVV code of VISA credit card). Other data being sent may include ID data to identify the POS terminal and/or the merchant, the type of offering (e.g., product or service being purchased) and the amount of the transaction. The payment processing network may then send (and data server 110 may receive) data indicating approval (or denial) for the transaction, and depending on the protocol(s) specified, this approval or denial may reach the data server 110 and control engine 112 of FIG. 1 directly from the payment processing network, for ensuing approval or denial from the data server and control engine 112 to the POS terminal, or alternatively, the payment processing network may send the approval or denial to the POS terminal which then conveys such status of the data server 110 and control engine 112. As a further alternative, where the data server 110 and control engine 112 are operated on behalf of a bank which has issued the selected card or account, the bank may directly convey the approval or denial indication to the POS terminal without involvement by any third party such as one of the payment processing networks.

FIG. 2 an example flow diagram for a system, such as shown in connection with FIG. 1, useful for illustrating one of various examples of how data for such transaction may be processed in accordance with certain examples of the present disclosure. The dashed lines pointing into block 210 and pointing out of block 222 of FIG. 2, show how this exemplary process is somewhat integrated with FIG. 1. At block 210, the data server 110 may receive transaction data for a prospective transaction such as discussed above in connection with FIG. 1. At block 214, the control engine accesses a database (e.g., "DB" such as in memory 101 of FIG. 1) to retrieve from the appropriate user profile, the relevant information corresponding to the user's transaction card or account (UTE for unified transaction equipment). This relevant information may include, for example: recent user-provided input to prioritize use of one of the transaction cards for certain conditions (e.g., for a limited time or until a certain threshold of dollars are spent via the one of the transaction cards), and prospective award of rewards benefits and/or points for the user if the current prospective transaction is completed using each of the transaction cards or accounts as indicated via the user's profile (e.g., which may be linked or qualified to the type of offering which is identified by data received in connection with the current prospective transaction. At blocks 216 and 218, the control engine 112 assesses the available rewards for processing the current prospective transaction for each of the transaction cards or accounts, and then recommends or selects the transaction card or account which is optimal given the constraints and rewards as indicated in the user's profile. From block 218, flow proceeds to block 222 where communications are affected to confirm and/or finalize the transaction, for example, using the transaction card or account as recommended or selected at block 218, with data for the transaction being sent to the appropriate payment processing network (e.g., #1, #2 or #3 of FIG. 1) as discussed above.

In one specific method according to the present disclosure, a set of processes involves first collecting data from the person and on the possible credit cards available from different vendors. Then a comparison of the past credit card usage and/or the simulated future usage is made by comparing the pool of available credit cards. A list of suggested novel credit cards to be opened and what might be the best way of using them, specifically tailored for the person, is provided. This may be decided and realized automatically, in real-time or near real-time, for indicating which payment method is the optimal choice for a specific transaction. Accordingly, certain examples of the present disclosure are directed to resolving one or more issues burdensome to the typical customer, such issues including: carrying multiple payment methods, and related info, at any time, effortlessly in any smart device; accommodating the user who may forget, or not be aware of, benefits and fees or charges linked to different payment methods which may be applicable to a specific time and/or for a specific vendor; and accommodating the user who may forget, or not be aware of, the financial situation of one or more of its payment methods (for example, if the user is close to the credit limit of a credit card, or to a valuable threshold of the credit scoring).

Figures 3A, 3B:
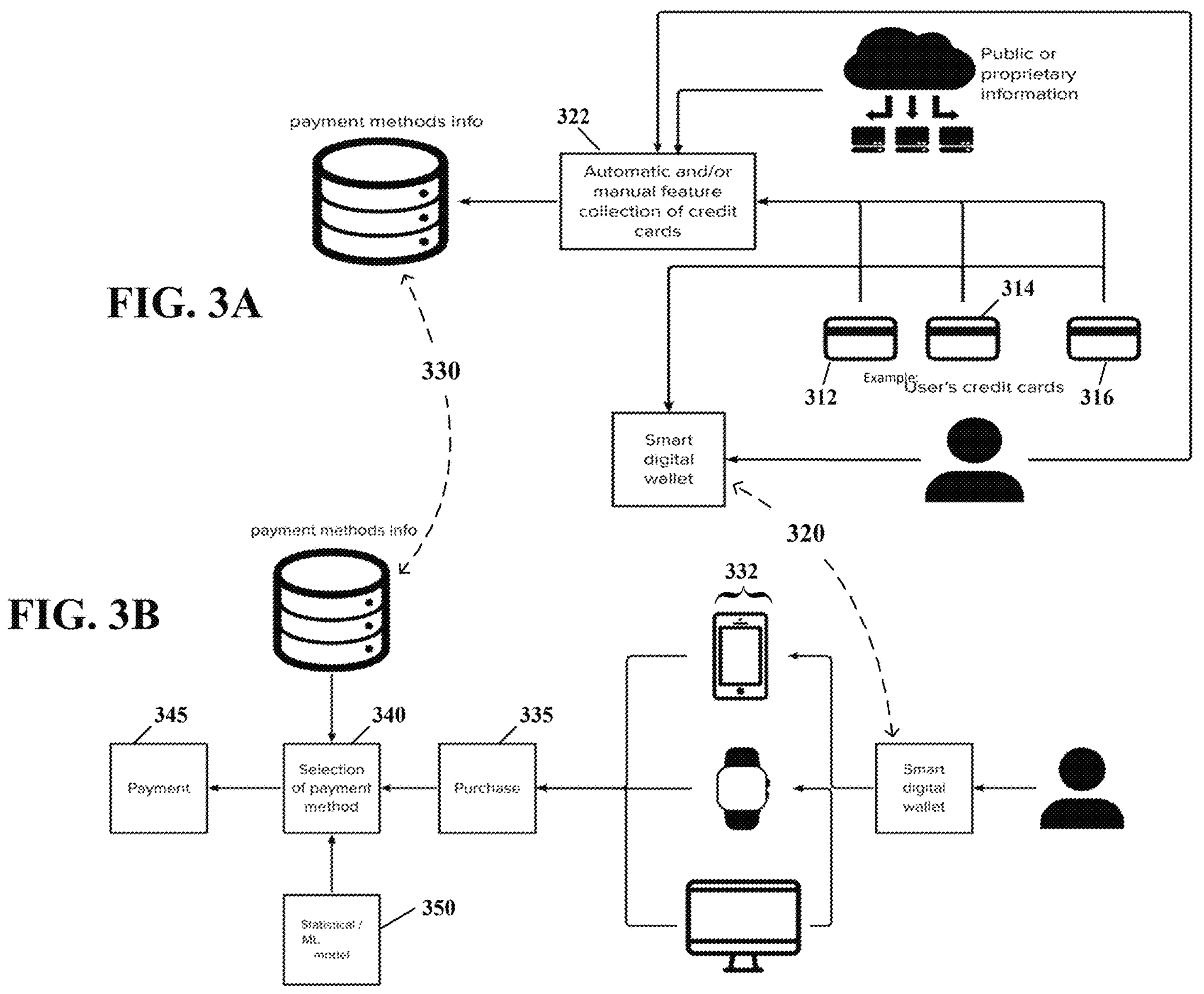
FIGS. 3A-3C are illustrations relating to an exemplary type of CPU-based data processing systems, in accordance with certain examples of the present disclosure, to accommodate analysis of multiple transaction accounts, with FIG. 3A being an example data and computation flow diagram of the setup of such a system, with FIG. 3B being an example data and computation flow diagram for automatic payments implementing a best payment method, and with FIG. 3C being an example data and computation flow diagram for semi-automatic payments that require a user of the transaction (e.g., credit or debit) card to acknowledge and/or approve a selection of a recommended best payment method.
Figure 3C:
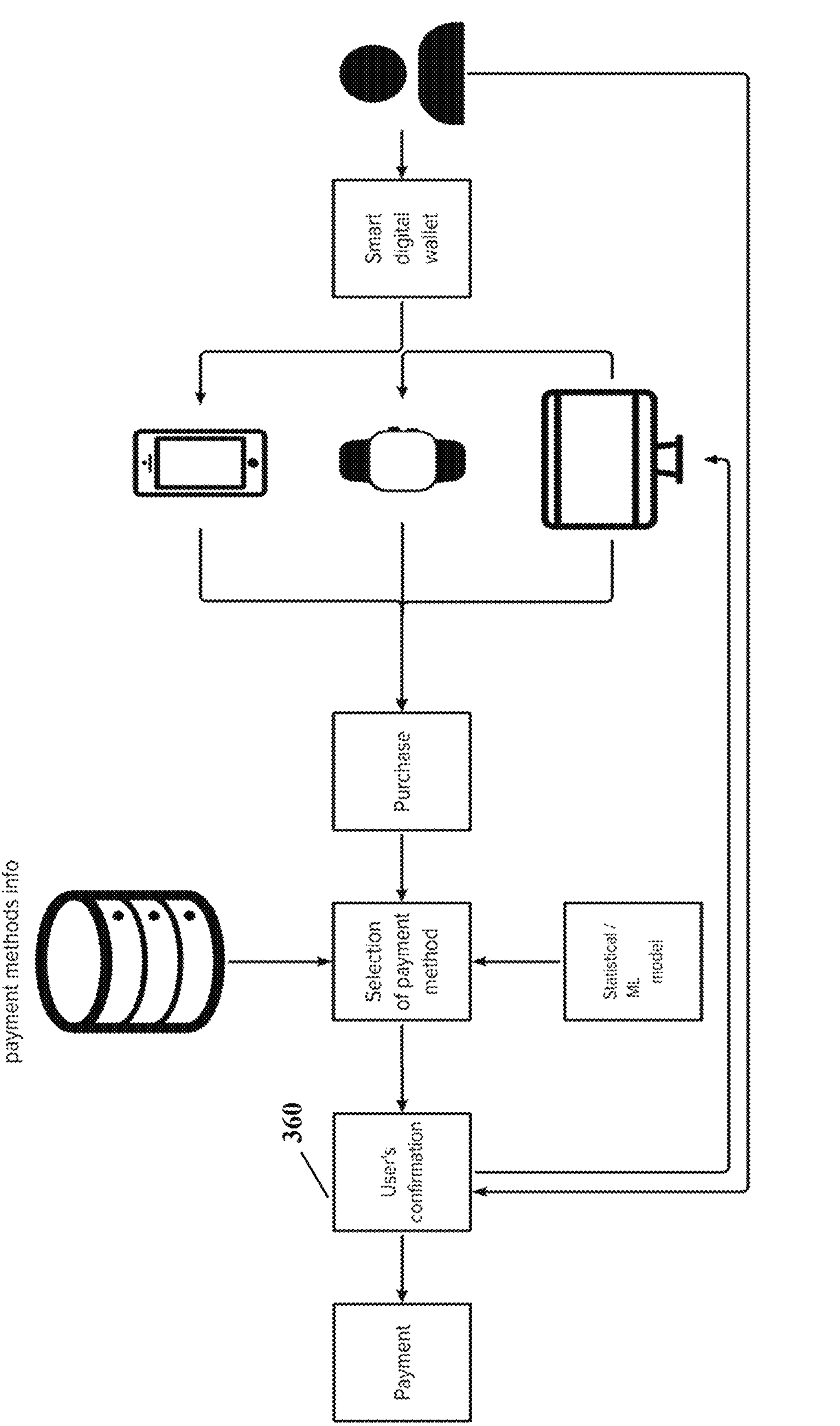

Also in accordance with certain examples of the present disclosure, FIGS. 3A, 3B and 3C illustrations of exemplary types of CPU-based data processing systems including one or more of the previously-disclosed aspects (e.g., the system of FIG. 1 or the method of FIG. 2), to accommodate analysis of prospective use of each of multiple transaction accounts, stored on behalf of a user (e.g., registered as an owner of the accounts). Each of FIGS. 3A-3C corresponds to an example type of system and/or CPU-implemented method to automatically or semi-automatically decide (if user confirmation of the recommended transaction card is used) which of multiple payment methods that an authorized user would use for a specific (purchase) transaction. For any such system, the user may firstly link multiple payment methods via their respective data sets for use (e.g., VISA card number, CVV, expiration date, billing address, etc.) with their user equipment (e.g., in a multiple-accounts database accessible to the user) and/or an independent user-profile database (e.g., stored in a medium such as cards or memory circuitry on behalf of the user) and linked or corresponding to the user as discussed above.

For additional security purposes, coded and/or encrypted numbers may be used in the user's equipment (aka "user equipment" such as smartphones, laptops, desktop, etc.) and in connection with the POS to represent the relevant data for using each of the multiple rewards-type accounts. The information for decoding these numbers (in the case of encryption/decryption, key) may be used and controlled by the backend computer processing equipment. In this way, if the user equipment (e.g., smartphone) is lost or stolen, there is almost zero risk of any of the multiple rewards-type accounts being breached. In different example embodiments, this type of approach may be implemented by the user downloading an encoding/encryption app onto certain authorized user equipment (or accessing an encoding/encryption process controlled directly by the backend processing circuitry (e.g., a bank's CPU system) and then all further communications involving transactions at POS terminals and/or involving the user and/or involving the user equipment may proceed without conveying any actual data linked to any of the multiple transaction accounts. Alternatively, the data linked to any of the multiple transaction accounts may be provided to the backend circuitry without encoding and/or encryption but once this information is stored by the backend circuitry, and from that point all further communications involving transactions at POS terminals and/or involving the user and/or involving the user's user equipment may proceed without conveying any actual data linked to any of the multiple transaction accounts. As payment for each such transaction must be eventually tendered to effect payment to the POS retailer selling the products/services, such payment is effected by the backend processing equipment and the automated clearing house (ACH) without ever disclosing actual data linked to any of the multiple transaction accounts.

Systems and methods disclosing computing-processor equipment in such backend circuitry and manners in which such backend circuitry be operated to switch between different possible payment platforms (e.g., VISA, Discover, American Express) based on user-held accounts are disclosed in various U.S. Patents assigned to the assignee of the instant disclosure (see, e.g., U.S. Pat. Nos. 9,881,131, 9,367,839, 9,424,562, and 9,147,184), each of which is incorporated by reference in its entirety and for the specific aspects relating to such backend circuitry and its manners of operation.

To implement such a system as in FIGS. 1 and 2, a database for the system may be created so as to include all, or almost all, known rewards payments cards in the U.S. marketplace, and this database may be built with links to other stored data to provide the sufficient requisite knowledge for the system to operate a business rules engine (referring to analysis circuits inclusive of those using a rule-based statistical model). The database may be queryable and may include the transaction card (or account) issuer, the card product name and BIN, the loyalty partner, the rewards earn and/or burn rules, acceptance locations, and the card and rewards terms and conditions. The database may be built and used in one or more account- or card-related categories; as examples, these categories may include business accounts only, personal accounts only, debit transactions only, prepaid rewards payment accounts only, highly-sensitive accounts only (e.g., based on high monthly limits or on medical-related purchases) digital or crypto accounts only, and credit transactions only. Such a database may also contain multiple or all such categories and be used or configured as separate databases. Other kinds of rewards cards/programs can be added over time (e.g., merchant-funded rewards, coalition rewards, blockchain rewards, digital gaming rewards, etc.).

In certain example embodiments according to the present disclosure, the system may find and keep track of current rewards payment cards. If a transaction is happening, by tracking in this manner, the system can complete the transaction but alert the user that the transaction has been initiated (e.g., and verify for security purposes) and if applicable, that there is a better (e.g., replacement) rewards card available for them to consider.

The system may also include a business rules engine (e.g., as part of the computing processing circuit in the backend circuit) wherein the engine's functionality receives data corresponding to user preferences and goals (e.g., via a GUI configured to work with an authorized user over a secure channel), along with the rewards data information on the transactions accounts (or cards) the user holds. In connection with such a business rules engine, rule-based statistical modeling and/or related tools of third-party APIs and/or vendors may be used. In one specific example embodiment also according to the present disclosure, this aspect refers to a rewards maximization process which reviews all the transaction accounts (e.g., as may be represented by transaction cards held by a user) and, if there is a card where rewards will be issued after a certain threshold is met, the process is to choose that rewards-specific transaction account over a rewards-specific transaction account because the value to the user is greater. Either overall or for each card, the user may selects an overarching goal (maximize points/miles, minimize interest, maximize cash-back, minimize monthly minimum payment, etc.).

The business rules engine may execute algorithms to compare and select the best card to use, given the payment context (e.g., taking into account the user's apparent need(s), the user's schedule or venue (e.g., scheduled flight and/or airport, and type of product/service identified as part of the prospective purchase)). When queried, the business rules engine may run an algorithm (e.g., via an AI/ML engine) based on the cards the user owns and the location/domain that they are going to be paying in to recommend the best card to use. For example, the "best" card or account to use may correspond to the account which, upon its use for the transaction, yields most valuable points given the rewards program/location (transactors) or the least interest expense given the interest rate of the account or card.

An aspect of the system (e.g., front-end equipment and/or backend circuit) may be configured to accept information by using a query regarding the location/domain a user is likely to be or is paying at (and in certain example, the system knows the cards the consumer has registered). If the front-end equipment (e.g., in the form of physical transaction cards) is configured to provide data to identify the transaction accounts, the backend circuit is to match those data identifiers (e.g., stored on such cards) to the rewards cards database which may be part of the backend circuit.

Further, the system may be configured to run a calculator algorithm to maximize rewards points and/or minimize interest costs based on the location and/or domain and card information to make the right recommendation. These actions may be done in real time by using the rewards details (balances of points accumulated, threshold amounts for points, etc.) which are previously stored in the system's database.

To enhance security and comply with many security protocols, the system may also be informed (by the user and/or other resources such as smartphone geo-locating data and/or connected sensors such as smart cameras) of whether the prospective transaction is occurring at a retail-store POS or at a remote transaction over a CPU, and where the prospective transaction is occurring (e.g., preferably the address or other geo-locator of each of the seller's location and the front-end equipment).

Certain systems according to the present disclosure may use an artificial intelligence engine (as one or more AI/ML algorithms executed by the backend circuit and in some instances by circuitry in the front-end equipment) to learn from the activity in the business rules engine and database. Such an artificial intelligence engine (e.g., AI/ML process) may be used to enable the backend circuit to effect the recommendation by using a business rules engine which learns and becomes more predictive (e.g., better at selecting the best card to use).

Building on the above AI-related aspects and example systems, various other example systems according to the present disclosure may use an artificial intelligence engine to suggest to the user that new and/or replacement cards be used, to detect user's goals and/or apparent needs, to create an offline lookup table to set up correlations between payments (transaction types and/or payment amounts) which lead to the best credit card, to detect the best credit card to use for a specific identifiable payment, and/or to create an online detection of the best credit card to use for a specific payment. This suggesting by the backend engine may be implemented, for example, by the user selecting an overarching goal (maximize points/miles, minimize interest, maximize cash-back, etc.), and this may be done overall considering multiple ones of the transaction accounts together or separately for each card.

The system is also able to provide an output report for the user so as to report on purchase transaction history based on the transaction accounts (or cards) being used, along with points earned or projected interest saved and any further useful data such as a suggestion that "Next Time, this card would be better" for realizing greater rewards benefits.

For one or more of the above processes, the backend circuit may create one or more models stemming from "if-then" heuristic learning online feedback from the user (or the user's silent acceptance of the recommendations) for improving the accuracy of the algorithm, for example, by adjusting parameters of the model.

In another example, the system may use an AI/ML (recommendation) engine which is configured to run a calculator algorithm to maximize rewards points and/or minimize interest costs based on the location/domain and card information to make the right recommendation.

As the database and rules engine are populated and transactions-based activity occurs, recommendations are made oftentimes with user feedback (e.g., express or implicit approval, and alternative selections by the user(s)), and, in turn, this process may be used by the backend circuitry to facilitate learning by the AI engine and thereby improve the AI algorithm(s) and recommendations.

A business-rules or statistics-based model may be used by the AI engine to aid in the recommendations. Such a model may be used to provide highly personalized suggestion to the user for adopting new payments methods (e.g. new credit cards) to use. This may be part of an example embodiment for which the system suggests a better card than one in current use by the user.

Such a model may also be used to detect automatically the financial goals/needs of a user; for example, to automatically detect the rewards to maximize according to the past and predicted future user expenses or the best way to minimize penalties. For example, to optimize a certain threshold benefit from use of a rewards card linked to purchasing a gasoline at a certain gas station, the system learns that the user typically purchases gasoline twice per month and upon recognizing that the user should be about ready to purchase more gasoline, the system may prompt the user to purchase gas at the certain gas station and to use the card that would realize this threshold benefit.

This AI-based system may also receive data concerning, and learn from, the user's transaction-related and/or event-related behaviors, trends and patterns, and based on this learning, the artificial intelligence engine may predict future opportunities (e.g., recommendations of one of the transaction accounts (or cards) which effectively may convey "use transaction card A to maximize rewards linked to X", or challenges the use of one of the transaction accounts which effectively may convey ("you will lose points if this transaction account is used", or "you may go over the credit limit if this transaction account is used"). As examples, the engine may observe and learn that the user is selecting a certain subscription channel for watching movies and/or television (e.g., possibly at scheduled times via a calendar available to the backend circuit), and in response the system may react to these events by recommending a transaction account (e.g., an account with Amazon Prime which is linked to Prime Video) for watching the movies or shows on this subscription channel for less money and/or while accumulating rewards each month the transaction account is in use.

In typical examples according to the present disclosure, the system may receive certain information from or on behalf of the user. In related more-specific examples, the system may also enable the user to set their preferences for each card, then set goals that may or may not be tied to one card, and the system may know what type of transaction is being made (e.g., based on transaction data sent from the POS) and then select the card based on that information. Once this information is provided and accessible to the system, the system may be configured to monitor card sites and card-issuer systems and make recommendations to users for cards that might better meet their needs. For example, the system may monitor transactions of respective users over time, and recognize/learn that the user spends a significant amount of money on restaurants. If the user does not have a card that maximizes that type of purchase; the system alerts the user to consider applying for a card that would allow them to maximize their spending capabilities. In certain examples of this type, this methodology applies to aspects such as for systems which not only capture user transactions, goals and preferences, but also keep track of all transaction account reward programs for comparison to what the user currently holds in the form of transaction account reward programs.

As shown in FIG. 3A, such a system as shown in FIG. 1 may be configured with the system processing, including assessing and selecting for the user, one or more of the linked payment methods such as transaction cards 312, 314, 316 etc. which are depicted as credit cards but may also be any combination of one or more credit cards, debit cards, bank account(s), crypto wallet, etc.

In a particular example, such individual transaction cards are represented on behalf of the user for use on an individual basis and/or for use via a unified transaction card (representing two or more designated ones of the individual transaction cards) in a smart digital wallet 320, with the provider/backend circuitry overseeing blocks 322 and 330 having more-secure communication protocols between the provider and necessary entities (e.g., clearing houses, banks and providers of platforms for use of the payment processing networks) involved in approving payments/rewards for the users' individual transaction cards and related accounts. A computer-implemented circuit 322 may be used with a user interface (not shown in FIG. 3A) to automatically and/or manually collect data for the accounts associated with the user's transaction card, and this information may be stored in a user-profile database 330 which may store such payment data and user-preferred methods for using each transaction card along with the user identity and secure-identity access information. Such secure-identity access information may include, for each transaction card and/or for general access to any of the transaction cards: login and password, and biometric (e.g., fingerprint, eyeball, voice and/or face-recognition data). Advantageously, by configuring the system of FIG. 3A to permit the user general access to any of the transaction cards via a single set of one or more secure-identity access protocol(s), the backend circuitry configured with a secure gateway to implement such access (e.g., for a particular purchase and/or for editing data relating to such secure-identity access(es)) alleviates the user from the burdens of having to store and recall login and password information associated with each of the multiple transaction cards represented by the virtual account. Moreover, by using a single protocol as authorized by the provider (e.g., bank or other financial institution) operating the backend circuitry, a more sophisticated protocol (e.g. two- or multi-step login/verification process) may be used to increase security to all of the transaction accounts represented by the user's virtual transaction account (and/or card). Further, by alleviating the burden of the user having to know, and potentially being exposed to unscrupulous parties, the login data for each of the represented transaction accounts, a single such more sophisticated protocol may be used with increased levels of user interaction which effects a significantly lesser burden than would be associated with having to store and recall login data for even a small number of transaction accounts represented by the single virtual account (card). As one specific example in connection with block 322 and secure database 330, the system of FIG. 3A may implement a two-step login/verification process based on a first step involving a conventional protocol, wherein the user initiates an attempt to access by providing login and password data for the unified transaction account as stored by the provider in a portion of (decoupled) memory which is decoupled from the secure database 330 (e.g., by a firewall-secure gateway used only internally by the provider and inaccessible to any outsiders) and the second step is a communication including a random code provided back to user equipment (e.g., as selected by the user with the attempt to access) and the user is to enter a variation of the random code into the user equipment before the provider is to permit the requested access. The variation of the random code can be based on any variety of different parameters (e.g., preselected by the user/provider and stored by the provided in the decoupled memory), only one of which would have to be recalled by the user. As specific examples in this context, the variation of the random code can be the provided random code which is offset (e.g., plus or minus) by a specific number (e.g., the number of the user's siblings, children, favorite pets), and/or can any combination of two or more of a set of previously-designated such offsets such as with one such offset being used in even months and another offset being used in odd months. Also, the code need not be random but rather a code which is updated as a provider and/or user designated code on a regular basis; for example, each month the code may be varied as one from among categories of user-provided personal data (e.g., names of relatives, anniversary dates, names of pets) used in a particular protocol carried out in a secondary step of a multi-step process with the user-provided personal data and/or the particular protocol being part of monthly communications involving user-authorized payments on previous statements. As awareness of suspicious activity is raised or detected by the provider and/or the backend circuitry, securing for the virtual transaction account and each of the individual transaction-card accounts may be changed, updated and/or otherwise made more secure by way of a single change in such a protocol between the provider and the user.

While FIG. 3A and related figures FIGS. 3B and 3C (among others herein) may illustrate one or more transaction cards (as appropriate for certain specific examples), in view of the other examples disclosed herein it will be appreciated that in certain related example embodiments one or more physical transaction cards are not required (e.g., as exemplified by the smart digital wallet 320). Each such transaction card may be viewed, for discussion purposes, as indicating that the user holds multiple rewards-based transaction accounts and, depending on the specific example embodiment wherein the backend circuit is already configured with the identity of the user's multiple rewards-based transaction accounts, the backend circuit may be configured to recommend and/or select one or more of the multiple rewards-based transaction accounts via a protocol, for example, that is based on data for accurately verifying the identity of: the user; and/or one or more of the devices used as part of the frontend user equipment for initiating or effecting the prospective transaction via the user's multiple rewards-based transaction accounts.

In certain implementations, such a system as in FIG. 3A can be used to support electronic and in-person transactions and the system can automatically decide which one is the best linked payment method to be used for the specific transaction in order to satisfy specific criteria provided by the user or to maximize rewards for the user's benefit. The decision might be executed automatically and thus instantaneously, or with a required acceptance from the user. In other implementations, such a system can be communicatively coupled with the user's transaction-enabled device (e.g., over the Internet or another (broadband) link) for operation which may be semi or fully automatic, using public information (e.g., searching the Internet) or via proprietary information (e.g., via the user's profile as in FIG. 1), or by the system asking directly to the user to provide the information in other ways (e.g., by manually typing, speaking, by engaging or otherwise tapping on a responsive data-communicative interface (such as a smartphone, eyewear, clothing and/or by coded motion in front of a sensor)).

For the many customers who hold several credit cards and each credit card typically having different pros and cons as well as many different types of benefits, it is often burdensome for the average customer to apply the attributes appropriately or as desired to receive such benefits. One example in this regard is for cash-back or rewards received by a credit card for a certain category of spending. Another example might be the overuse of a single card of its credit limit, potentially hurting the user's credit score. By using one of the systems disclosed herein (e.g., in connection with FIG. 1, FIGS. 3A, 3B and 3C and/or the method of FIG. 2), the system is able to automatically decide which of the user's payment methods (e.g., credit/debit cards, bank account direct transfer, etc.) is the common user's choice and/or the better choice for each purchase transaction.

Consistent with each of the specific examples shown in FIGS. 3A, 3B and 3C, a system may store data for multiple transaction accounts in a database (e.g., similar to a smart digital wallet) in user equipment, or elsewhere with access to the user via a secure protocol, and the system can then automatically decide which is the best multiple transaction account to use for payment for each specific POS event or transaction. The system may be seen as enabling a type of user-equipment electronic storage memory for multiple transaction accounts, or as integrative part of any existing smart digital wallet. Consistent with the present disclosure, the database including the multiple transaction accounts may sometimes be referred to as a multiple-accounts database. To store such data associated to the multiple transaction accounts into the multiple-accounts database, the user connects the system (e.g., into a user profile as discussed above in connection with FIG. 1) and enables the user equipment to capture (e.g., manually entered, electronically and/or optically captured, etc.) one or more of the payment methods, such as credit or debit cards, bank account, crypto wallets, etc. For a given prospective transaction (e.g., responsive to the system receiving transaction data from a POS terminal), the system will then automatically detect (or look up) the features of each linked payment method. Such features may include reward points, cash-back reward percentages for different categories, rewards varying the period of the year, interest fees, interest charges, annual fee, credit limit of the user, etc. If the automatic detection of all, or a subset, of the information is not possible, such information may be requested from the user as a manual entry. In a more specific example for illustrative purposes, one such feature might also include what rewards merchandise, trips, etc. are available in the rewards catalog and the relative price in points for such rewards to see which program has the best deal for each reward (e.g., this program can get a first class flight to Vegas for 45,000 points, but this other one can get it for 37,500 points).

In such a system as above, the user-equipment (smartphone including such a storage register) can remotely, and safely collect the user's information and the user may use this equipment over multiple devices via internet connection, such as smartphone, smartwatch, personal computer, etc. The user may, at any time, add new payment methods and/or remove any of the payment methods that were previously linked. Concurrently, the system may, or may not, involve the creation of a model, based on statistical metrics, or AI/ML models that references a stored (e.g., evolving) profile with data characterizing a user's behavior. In other examples, the system may use AI/ML models and/or computer-processing circuitry configured to learn a user's habits and/or common behaviors and enabled to act, communicate and/or simulate aspects of user's past behavior in terms of a specific selection (e.g., selecting the appropriate transaction card or account, and/or pre-approving certain types of transactions).

The user equipment including the multiple-accounts database may be used by the customer to do any of a variety of transaction types, such as payments via multiple devices, for example using a smartphone, or a smart watch, or a personal computer, etc. In one example, at the time of the purchase the user equipment including the multiple-accounts database automatically defines which of the linked payment methods is (e.g., likely) the best user's choice to be used to make the payment. Once the best choice for the payment methodology is made, the user might opt for the automatic payment, in which case the system may directly continue to the actual payment without any other further input from the user. The user might also opt for an acknowledgment of the payment for each choice or, for example, in cases in which the best option may differ from a defined automatically-determined (e.g., default) payment method. In this case where the system is effectively recommending the choice, the user equipment including the multiple-accounts database may require a user confirmation for the use of the best detected payment method. The user may also be able to change the proposed payment choice with any other account of his/her choice.

In various examples, the (e.g., likely) best choice may be characterized in different ways, by using statistical metrics and/or a Machine Learning model, and it may consider different factors to be optimized. A non-exhaustive list of examples of such factors to be optimized include one of the following or any combination of two or more of the following:

a) The use of systems to emulate the choice that typically the user made in the past when purchasing at the specific vendor. Examples of such systems may be statistical metrics, Machine Learning models, Financial Digital personal Twin, etc.

b) The use of systems to emulate the choice that typically the user made in the past when purchasing at the vendor's category. Examples of such systems may be statistical metrics, Machine Learning models, Financial Digital personal Twin, etc.

c) The choice of the linked payment method, for example credit card, that provides the best reward for the specific purchase.

d) The choice of the linked payment method, for example credit card, that provides the best cash back for the specific purchase.

e) The choice of an alternative best payment method, if the best one, according to the other factors, may be hurtful; for example, by exceeding the credit limit, or a threshold of the credit limit that would lower the user's credit score. In that case, for example, the use of a debit card may be considered the best option.

Accordingly, in the above and other examples consistent with the present disclosure, certain specific systems may be configured to provide an automatic detection of the best payment method to be used for each specific customer. Such systems may also be varied or controlled to various extents by the user altering the data in the multiple-accounts database (e.g., by sending data from a GUI to edit and adjust certain of the data in the user's profile). Advantageously according to yet further examples of the present disclosure, such automated selection of the best payment method, does not necessarily rely on any other technology, and may be integrated in existing digital wallets and related digital-wallet equipment including, for instance, user equipment incorporating Google pay, Apple pay, etc. to provide automatic assessment and selection of the best available payment method to be used for a specific transaction made by the user.

In certain specific system configurations, at any time, the user may use and/or activate the user equipment to make a transaction, for example, to perform a payment via a POS. Such payment may be done online (web payment) or in a retail store, via contactless in-person payment. At the transaction time, the user may be able to directly use the system to recommend and/or select the appropriate transaction account (and if applicable, one of the selected account's forms of payment such as by reward point and/or cash). With the system being configured by the user to operate in this manner, the user need not be involved any further as the system can take care of the decision of the best payment method and the user can rely on the system for making the best choice to perform the specific transaction given the configuration parameters provided in connection with the multiple-transaction accounts and/or user preferences.

Further, the user may be able to decide whether the payment may be done automatically after the automatic choice, and if the system will need a confirmation by the user about the choice (for example with requested feedback, once the user would agree to the suggestion or recommendation, the transaction will be performed). In the latter case, the system can generate personalized recommendations (or suggestions) of best credit card usage for a person.

FIG. 3B is an example data and computation flow diagram for automatic payments implementing a best payment method using some of the same circuit-based blocks of FIG. 3A including blocks 320 and 330. More particularly, FIG. 3B depicts the high-level functional flow of a transaction requested by the user (or customer) via user equipment 332 with purchase information as depicted as being sent via block 335 and selection of payment method (e.g., one of the various transaction accounts represented by single account data in the smart digital wallet) at block 340. In particular, this figure shows the flow when the decision of the best payment method does not require the user's confirmation. The user may decide that different (smart) devices can be used to make one or more payments or types of payments. In this type of configuration (e.g., stored in the user profile by the backend circuitry), once a payment is requested at block 345, the system will automatically decide which of the payment method is the (e.g., likely) best option and it will be used for an instant payment. Block 350 illustrates optional use of a statistically-based machine learning (ML) algorithm which may be used to drive the selection taking place in connection with block 340.

FIG. 3C is an example data and computation flow diagram for semi-automatic payments that require a user of the transaction (e.g., credit or debit) card to acknowledge and/or approve a selection of a recommended best payment method. As may be recognized based on the preceding discussion, this process is different than that as shown in FIG. 3B which is noted as showing the flow when the decision of the best payment method does not require the user's confirmation. Accordingly, FIG. 3C depicts the high-level functional flow of a transaction requested by the user via similar processing flow as that shown in FIG. 2, with the exception of a block 360 including functionality for a request to the user to provide a confirmation of or acknowledge the selected, recommended and/or chosen method of payment.

According to another aspect of the present disclosure and partly based on a system configured to have appropriately collected data identifying one or more transaction (e.g., credit and/or debit) cards of the user and/or the user's transaction usages of each such transaction card, the system provides a personalized suggestion on the best credit card usage for the user. Such a system may operate by obtaining permission to collect the transaction usages of each such transaction card before enabling such automated data collection for analysis by the system. For example, in another example of the present disclosure a system and method is to generate personalized suggestions of best credit card usage for a person. One such method includes first collecting data from the user and on possible credit cards available from different vendors. These credit cards may then be saved in a pool of available credit cards. Then a comparison of the past credit card usage and/or the simulated future usage is made by comparing the pool of available credit cards. Further, such a suggestion-type system may send to the user a suggested transaction to open (or a suggested list of transaction cards from which the user may open one or more based on the user's preferences and the user's or the system's perspective(s) on the best way of using them, specifically tailored for the person, is given).

Example embodiments of the present disclosure may involve additional implementations. In one more specific example of this type of system, automatic data collection in this regard might be via API that connects directly with the credit card vendor, and with the user providing the rights for the collection and/or its API keys. In another specific example embodiment, the information is shared with a Revocable Trust with the Bank as an acting custodian agent for the person and, therefore, within a contract, the user could see all of the transactions and allow the Bank to see all of the transactions. Yet another way of collecting data is by parsing credit card statements provided by the user with data for each purchase indicating information such as the type of purchase (e.g., gasoline, grocery, apparel, business versus personal, etc.), whether the purchase is being made while the user is away from his/her normal (home) venue, whether the amount of the purchase is sufficiently more than a certain threshold (in which case a competitive quote may be suggested). Another stage of the invention consists in the manual or automatic scrutiny of credit cards available by vendors, such as banks, companies (airlines, grocery stores, etc.), crypto exchanges, firms, etc., and storing the features of each card. Such features may include annual fee, cashback rewards, perks, APR, recommended credit score, etc. These features will be used to generate an accurate suggestion of the best card(s) for each user.

The system may use statistical methods and/or machine-learning models to analyze the historical data to learn underlying habits of each customer, detecting pattern in its spending, categories or recurrent payments, etc. The suggestion may be done by comparing the historical behavior of the customer (for example in the latest N months) and simulating such purchases and payments in each credit card of the analyzed pool. An example of this kind of suggestion might be "You could have earned $XXX in the last N months if you used the YYY credit card in grocery purchases". The simulation of the spending might be done considering each credit card alone, or multiple credit cards together, minimizing a cost function that might be directly derived by the total out-of-pocket spent by the customer (considering expenses, credit cards fees, cashback, interests, etc.).

Other possible suggestions may be done in a similar way, but instead of using historical data, by using future card usage of the customer provided by a simulator. An example of this kind of suggestion might be "You could earn $XXX in the future N months if you will use the YYY credit card in grocery purchases".

Suggestions might be based on past behavior of the user, both in spending (to optimize rewards and perks) and in payment (towards APRs and interest payments). Similarly, suggestions might be based on simulated future behaviors. Additionally, suggestions may be also tailored by some specific points defined by the user (e.g., and inserted into the user's profile as in FIG. 1), for example if he/she is willing to pay an annual fee, or if he/she is planning to have a life event, such as a state move, a marriage, etc.

In one or more of these types of example embodiments, the system may be configured to generate and provide to the user a personalized suggestion for the user to realize a clear perspective of savings and perks that he/she will receive from different credit cards. Additionally, the system may be configured to tailor personalized suggestion(s) based on simulated future credit card usage of the customers. Further, these suggestions may be tailored and personalized on each single customer, based on its past credit cards usage and/or future simulated usage.

Figure 3D:
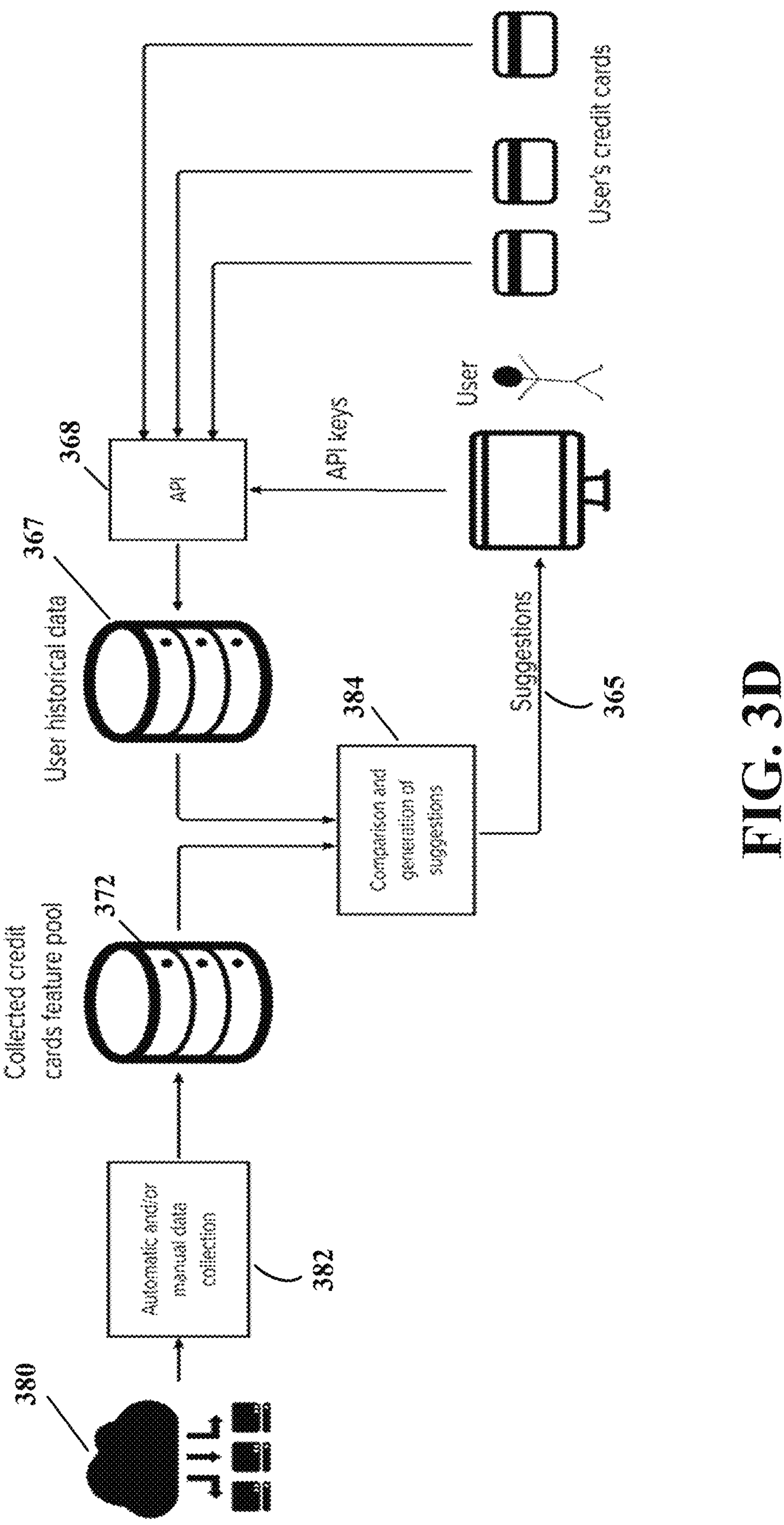
FIG. 3D is a diagram showing data and computation flow for suggestions based on historical usage data, also in accordance with the present disclosure.

FIG. 3D is a diagram showing data and computation flow for suggestions (at 365) based on historical usage data (as stored in database 367), also in accordance with the present disclosure. More particularly, FIG. 3D depicts the high-level functional flow of the creation of suggestions for a user. The user holds or has access to a set of one or more transaction (e.g., credit) cards and provides access to the historical data, for example, via API 368. As with block 322 of FIG. 3A, backend circuitry collects such data for processing transactions using the user's transaction accounts (e.g., user name and/or transaction account particulars necessary for effecting a purchase as though being made by the user on an individual transaction card) and such data sets are stored once into a database 372. In another data stream, a data collection of credit cards (available from different vendors) is accessed over the Internet (or Cloud as at 380), with either manual involvement and/or fully automatically (at block 382) and this collected information may also be stored into the database 372. Then the user historical data from database 367 and the collected credit cards information from database 372 are combined for assessment (e.g., compared) as at block 384 to simulate the outcome of the user-specific spendings and payments with the credit cards collected in the pool. Once the simulation is done, a list of suggestions is created and showed to the user via a computer (e.g., equipped with a display and/or GUI) as at 364.

Figure 3E:
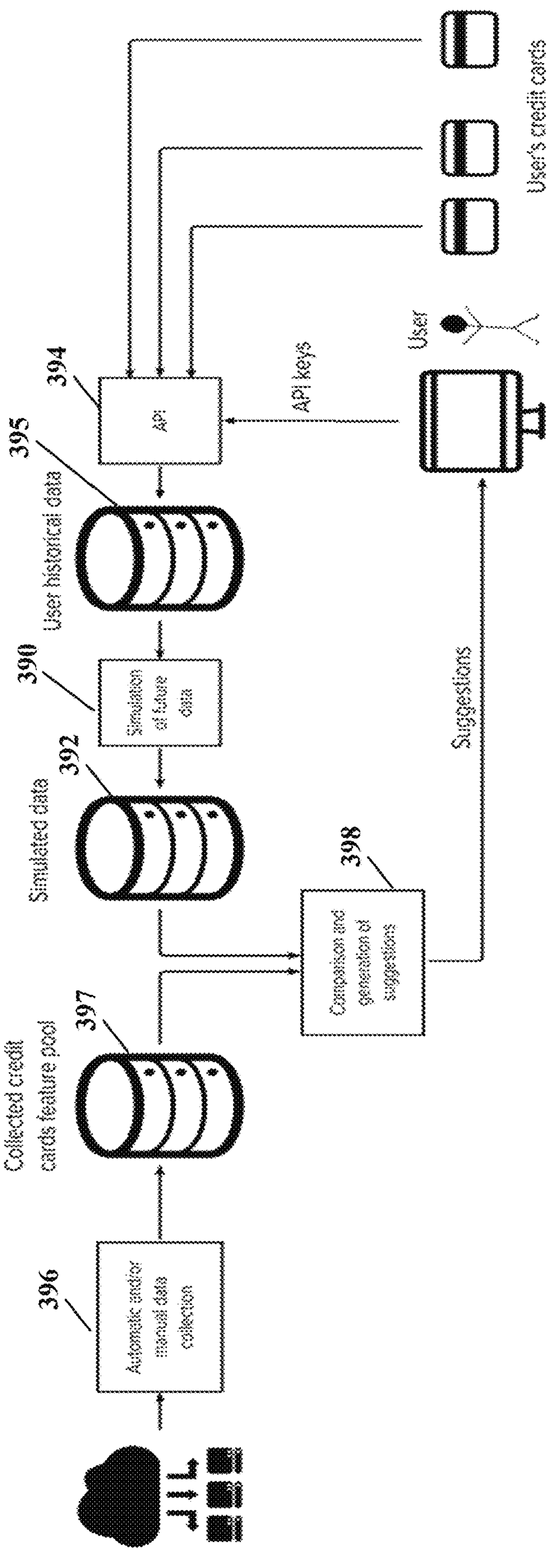
FIG. 3E is a diagram showing data and computation flow for suggestions based on simulated future usage, also in accordance with the present disclosure.

Also in accordance with the present disclosure, FIG. 3E is a diagram of a system with similar operational aspects as above in connection with FIG. 3D with the primary difference being blocks 390 and 392 being shown in FIG. 3E. Block 390 is a CPU-implemented block to predict and/or simulate (e.g., based on an AI/ML algorithm) future transaction-account selection and usage which may be generally for all types of purchases or for particular types of purchases (e.g., related to automotive, based on the user's venue, based on realizing a certain rewards threshold for a particular transaction account). Block 392 is a databased to store output data as simulated by the block 390. The data and computation flow associated with blocks 390 and 392 is for suggestions to be provided to the user based on such simulations and/or predictions.

As an example of such functional flow depicted in FIG. 3E, the user holds one or more credit cards and provide access to the historical data, for example via API 394. Such historical data sets are stored once into the database 395 and are used to generate a simulator of the user habits with simulated data stored in database 392. In another stream, a data collection of credit cards available from different vendors is completed as at 396, either manually or automatically, and the information regarding the collected cards is stored in a third database 397 ("collected credit cards feature pool"). Then the two (or more) stored data sets are combined and compared as at block 398 to simulate the outcome of the user spendings and payments with the credit cards collected in the pool, as shown at block 394 ("comparison and generation of suggestions"). Once the simulation is done, a list of suggestions is created and displayed for viewing by the user.

FIG. 4 is another system-type block diagram illustrating another example system, also according to certain examples of the present disclosure. As with many aspects depicted in the previous figures (e.g., payment processing networks of both FIGS. 1 and 4), the system of FIG. 4 shows a control engine 411 at the core of which is control logic (circuitry)

405 with communicatively-coupled data servers for receiving and processing prospective purchase-transaction data involving a user in a purchase-transaction environment 460 (e.g., with a unified transaction card or equipment such as CPU, smartphone, etc.) as depicted in the upper left of FIG. 4. The control engine 411 is shown as the larger box defined by dashed lines around the control logic 405 as well as several other blocks. These other blocks include a database 401 which is used in a manner similar to the database 101 of FIG. 1, a module 422 which is used in a manner similar to the module 114 of FIG. 1, and modules 424 and 426 which are used in respective manners similar to the modules 116 and 117 of FIG. 1.

Also integrated with (or communicatively coupled to) the control logic 405 of FIG. 4 is a module ("AI/ML logic") 430 which is configured to execute one or more processes to optimize or maximize rewards for the user for a transaction in a purchase transaction environment 460 based on one or more parameters or attributes. In various specific examples, such parameters or attributes include one or more of the following: user-provided preference or priority data stored by the user data in the user's profile, the user's purchase habits (e.g., as may be implemented via statistical metrics, machine learning (ML) models, and information from a 3rd-party source (such as a 3rd-party analytics engine) 450 which may be configured to monitor and provide a data feed on rewards (including benefits) relating to the reward-based transaction cards (accounts) stored in the user's profile in the database 401 and/or provides a data feed on other reward-based transaction cards which might be deemed to benefit the user (e.g., based on the user's purchase habits) but are not yet stored in the user's profile. For such other reward-based transaction cards, the module 430 cooperatively works with one of the communicatively-coupled data servers 435 to inform the user or a designated representative (e.g., a family member or work colleague) of the opportunities concerning the other reward-based transaction cards. As previously indicated, these actions may involve a Bank as revocable-trust custodian acting as agent as well. In other examples, the third-party source 450 may be used to provide, or replicate for accuracy or training purposes, one or more aspects (e.g., as shown by way of blocks or engines) inside control engine 411.

Block 462 depicts such a person (e.g., the user or a designated representative) with user equipment (e.g., CPU, smartphone, etc.) with a user interface which enables authorization of the user for accessing and/or editing the user profile ("profile oversight") assessing information processed by the control logic 405 including suggestions and details concerning such other reward-based transaction cards. At block 462, such an authorized user person may also communicate, via one of the data servers and/or the control logic 405 to edit the user profile. For example, the user profile may be edited in this regard by weighting (or adjusting previously-assigned weights to) certain types of transactions or certain transaction cards as being preferred cards for a certain amount of time, for a certain type of purchase, for purchases made at certain venues which may be general (e.g., purchases made out of the U.S.A.) or which may be specific (e.g., purchases made in the proximity of certain retailers nearby the user's home or workplace). As another example, the user or representative may edit the user profile by activating or deactivating certain transaction cards. In a more specific example, this profile editing may involve activating a new transaction card that provides a bonus after a threshold amount of dollars are spent using the new transaction card (e.g., within three months of the card being activated) and may further involve significantly suspending the ability (e.g., at module 424) to select certain transaction cards for most all purchases until the earlier of the threshold amount of dollars being reached or the earlier of the three-month deadline after the card has been activated. In example configurations for which the AI/ML logic 430 has learned of the user's spending habits and/or approval of previous confirmations of certain transaction cards being selected for certain types of purchases and/or circumstances (e.g., venue, type of purchase, etc.), the user profile may be edited by the user operating the user interface to indicate that for the new transaction card, the primary goal is to obtain the initial bonus, and with this indication, the control logic automatically suspends the ability of the account(s) selection module 424 to select any transaction card other than the new transaction card for all purchases that align with the user's history and habits of purchasing so long as such purchases do not correspond to one or more special categories for which one of the previously-stored transaction cards is to be used. For example, a transaction card may be linked to the user's business or workplace indicated in the user profile as being exclusively used for an on-line order at an office-supply company, or a transaction card linked to the user's international travel as indicated in the user profile as being exclusively used to maximize benefits of that transaction associated with travel outside the user's home country.

With the user equipment of block 462 including a user interface, the system of FIG. 4 may enable such an authorized person (e.g., the user or a designated representative) to carry out certain security procedures relating to use of one or more of the transaction cards for effecting purchases and/or for editing and authorization purposes such as at block 462. As examples, the security procedures may be requirements as indicated and controlled via the user's profile and/or through respective profiles (or protocols) stored on behalf of the payment processing network (e.g., respective networks associated with transaction cards linked with VISA, MasterCard, American Express, Discover Card, etc.). For example, the user's profile may indicate that for certain of the user's transaction cards (e.g., designated as personal cards) and for purchase amounts greater than $150, a two-factor authorization or three-factor authorization and confirmation procedure is to be used. As another example, the user's profile and/or the profile of one or more of the payment networks may indicate that for purchase amounts greater than $500 (e.g., associated with designated ones of the user's transaction cards), an n-factor authorization and confirmation procedure is to be used where n is an integer of two or more (e.g., n equals 3).

Further, for security purposes, the user's profile and/or the profile (or protocol) of one or more of the payment networks may indicate that a special authorization and confirmation procedure is to be used (e.g., for certain conditions such as those discussed above) or for each purchase made via a transaction card that is not issued by the user's bank and thereby requiring approval and clearance by one of the respective payment processing networks linked to the transaction card. For example, where the control engine is operated on behalf of a bank, the special authorization and confirmation procedure may require that the bank's customized authorization and confirmation procedure be used between the user and the POS terminal (before forwarding the purchase transaction data to the selected payment processing network), and/or that the bank certify or assume responsibility should the purchase be deemed fraudulent.

As another example involving a security requirement imposed by a profile of the user or profile or protocol of the payment processing network, the user and the user's bank (on behalf of which the control engine of FIG. 4 is operated and from which the unified transaction card or account is issued), the imposed security requirement may require confirmation by use of a code or key which is to be conveyed by the user for confirmation before the purchase transaction is completed at the POS terminal. This code or key may be accessible only through the user's profile and may be designated by way of one of the user preferences, priorities or other recent activities entered into the user's profile by the user. The key may be an encryption key which is defined as a function of a code in the user profile, and with the code known only in the user's mind and in the user's profile, all data communicated between the control engine of FIG. 4 and the POS terminal (or a third party such as at block 450) is secured and interpreted only by the associated computer circuitry at both ends of the communication channel—the bank's system of FIG. 4 executing the appropriate algorithm(s) and with the code in the user's profile and the POS terminal (or the user's unified transaction equipment) being enabled to execute the same algorithm(s) with the user providing the code at the time of purchase.

As a specific example of such a code (irrespective of whether a key is used), the user may be pursuing rewards by way of a most-recently issued transaction card (e.g., for a bonus reward) or another regularly-used transaction card (e.g., rewards corresponding to 1.5% of the amount of each purchase), and in the user's profile this card is identified as the top priority card for the month and linked to a (e.g., reward-based) acronymic code such as MC490K which may represent "MasterCard for 90K" rewards points or linked to an old card (or a new card) being tested out as a priority card for obtaining rewards for a given month or months (as may be represented by a code TOBC (for "Test_Old_Brown_Card). Such a code would be changed every month to three months by the user editing the user's profile via the bank's secure link (e.g., between the communication channel shown between block 462 and the data servers of FIG. 4), and this code would be known to and/or readable by only the user (and not printed or emailed in connection with any credit card or bank statements. In this manner alone or in combination with one of the above types of security measures, for each of the user's transactions and whether or not involving one of the payment processing networks, the user may control a passcode stored privately with and maintained by the user's profile (maintained in a system on behalf of the bank), and this code may be used/overlaid as a passcode on a security-directed confirmation procedure (e.g., with an n-factor authentication process) to mitigate or prevent unauthorized purchases made through any of the selected cards via the unified transaction card/equipment 460.

Further, the control engine of the system of FIG. 4 may track and report statements and notices for the user concerning each or designated ones of the transaction cards in the user's profile. Such statements and notices of this type may be accessible to the user through the user profile, by regular paper-copy mailing, and/or be electronic communications (e.g., email, messaging, etc.). Via the user interface such as at 462 of FIG. 4, the user may customize the statements and/or notices, such as by arranging how the information for each statement is to be organized. This may be realized by the control logic 405 prompting the user (e.g., while the user is online and reviewing the user's profile) to select one or more of the transaction cards and also select one of a plurality of different statement formats for organizing the content of the statements. Alternatively or in addition, the user may configure the user's profile to direct the system in a customized manner for how and when payments are to be made and from certain selected ones of the user's bank accounts (e.g., using autopay, prepay directives, etc.), thereby mitigating or preventing missed payments and associated penalty/late fees. When such approaches are used in combination with one or more of the above security measures, there would be little reason for not using autopay for transaction cards.

FIG. 5 is another system-type block diagram illustrating another example system, similar to the system of FIG. 4 and relevant to tracking and reporting statements and notices for the user as discussed above. User reporting engine 525 in the system of FIG. 5 shows one of many ways through which such backend circuitry (or control engine) 512 may work with other computer-based circuits 526, 527, 528 and 529 to implement such tracking and reporting of statements and/or notices towards completion of a purchase transaction. For example, the user may be using the user-transaction equipment, via a user interface 530 remotely over a network 535 (e.g., broadband such as cellular network and/or the Internet, an ad hoc network or other type). The reporting engine 525 may receive updates via the control logic 536 and assessment circuitry 538 (e.g., via data in the user's profile at database or memory 537) and communicate the statements and/or notices via one of the data servers 539 which in turn conveys the statements and/or notices to the user via a user interface as previously discussed.

The user reporting engine 525 may work to effect exemplary functionality discussed with other example embodiments of the present disclosure. For example and as also depicted in FIG. 5, the computer-based circuits 526 and 527 may correspond to respective CPU-implemented modules that effect selection of one or more of the user's financial-transaction accounts and that carry out protocols for confirmation and/or finalization of the related purchase transaction. Further and as depicted as optional modules for this example (via dashed lines), the computer-based circuits 528 and 529 may correspond to respective CPU-implemented modules that be used to aid in effecting user communications for the related purchase transaction. The computer-based circuit 528 may be, for example, a user interface (e.g., based on GUI, tactile and/or audible communications) configured for providing prompts and/or suggestions to the user on which account should be best (e.g., and for which of various maximum values or advantages), and the computer-based circuit 529 may be configured to execute one or more AI/ML algorithms as also discussed herein in connection with various example embodiments of the present disclosure. In certain more specific examples, the computer-based circuit 529 may be configured to execute one or more AI/ML which are user selected before the transaction and/or while the user is at the POS and about to initiate or complete the purchase transaction.

Figure 6:
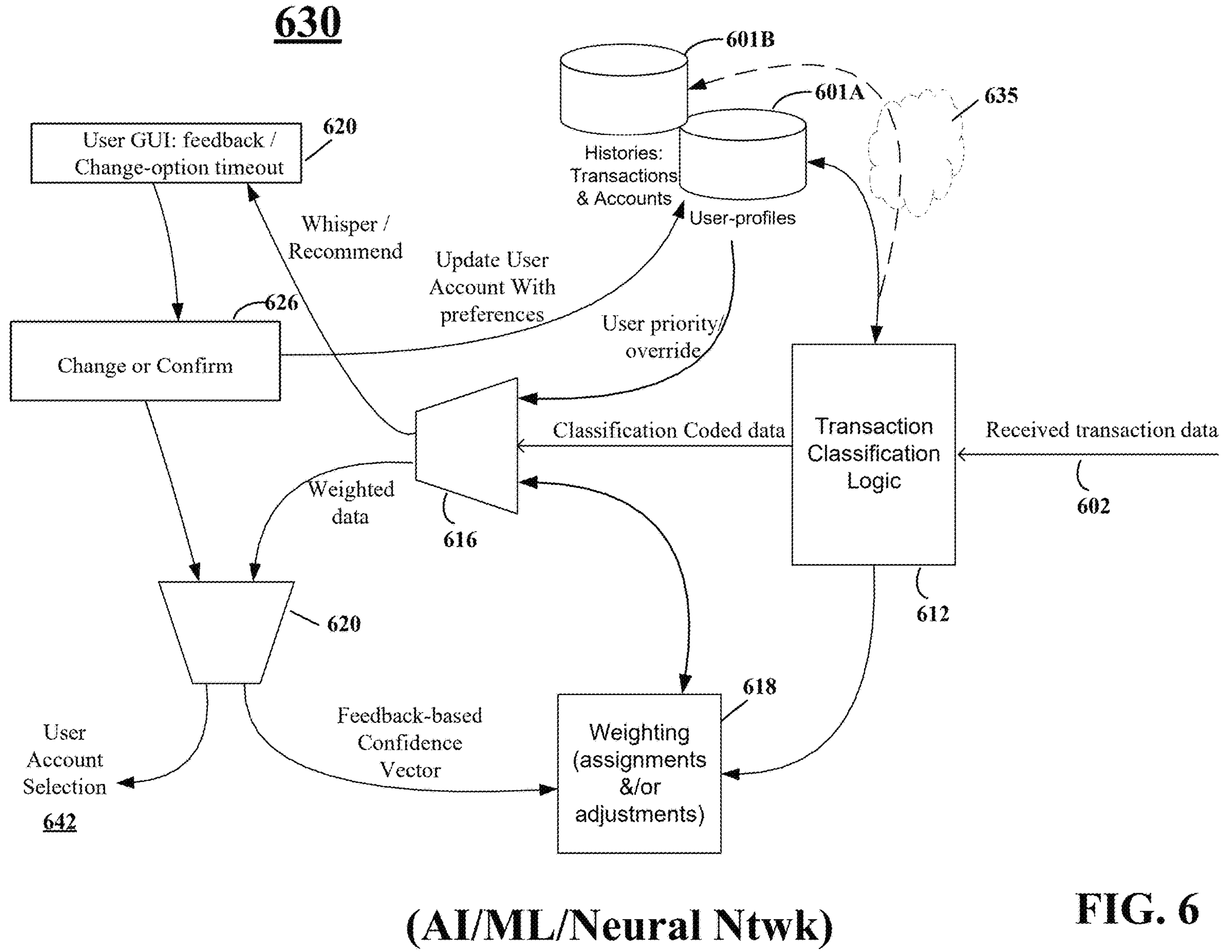
FIG. 6 is a block diagram highlighting exemplary aspects, involving artificial-intelligence and/or machine learning, which may be used in connection with certain specific examples, also according to the present disclosure.

Consistent with each of the above-disclosed systems, FIG. 6 is a block diagram 630 highlighting exemplary aspects, involving artificial-intelligence and/or machine learning, which may be used in connection with certain specific examples, also according to the present disclosure. The data flow depicted in FIG. 6 includes the system's control engine receiving the purchase transaction data 602 and then classifying particular parameters regarding the purchase at classification logic 612 (e.g., data to identify one or more of the venue, amount, type of merchant offering, the merchant, etc.). Cloud 635 depicts one or more networks (e.g., Internet, satellite network, cellular network) through which communications may be made for access of user-profile and financial history data between the classification logic block 612 and database 601A and 601B. By accessing the user's profile, the system obtains data regarding each of the user selectable transaction cards/accounts and the classification logic block 612 may code the transaction in a manner convenient for an assessment step (at block 616), wherein a data processing stage at 616 accounts for (e.g., by combining) any weighting or prioritization (at block 618) as may be added to the code for the transaction along with any user priority and/or override directive for this type of transaction. One of the outputs from block 616 may include a whisper, suggestion or recommendation to the user relating to a reminder noted in the user profile or suggested use of a particular transaction card via a user interface 620 under control of the user at the time of the purchase (e.g., the user's smartphone as identified in the user's profile or by sending data to the POS terminal for the user to review and reply. At block 626, the user may confirm, reject or provide input to modify or direct for use of a suggested/recommended transaction card for the purchase. Another of the outputs from block 616 may include the coded data as weighted (via block 618) and this output is provided to another assessment block 620. The assessment block 620 analyzes the code data as weighted along with any directive from the user regarding a user-specific choice of the transaction card/account to be used for the transaction. Next, by using one of the above-discussed criteria, models and/or algorithms, the system selects one of the transaction card/accounts in the user's profile, with the selection indicated as an output (user account selection) at 642. In connection with this selection, the system conveys to the POS terminal that the purchase transaction is approved, and the system then proceeds to process the charge according to a protocol indicated for the selected transaction card and optionally, with aspects as described above.

Weighting or adjustments to previously-assigned weights may be dictated in various ways to the different benefits offered in connection with purchases made using each of the one or more rewards-based transaction cards/accounts. As examples, this weighting may be provided: by the user (e.g., in the user's profile with the user assigning one of several different weights to types of rewards-related benefits); by an AI/ML algorithm based on preferences of typical users (e.g., maximizing purchases to reach bonus rewards with initiation of a new card); by an AI/ML algorithm based on previous preferences of the user (e.g., based on historical data regarding purchases made by the user with one or more of the transaction cards in the user's profile); and a combination of two or more of the above.

Using one or a combination of these weighting-related examples and assuming the weighting is provided on a scale of one through six with six being the highest weighting for the most preferred rewards-related benefit, the following exemplifies an example of weighting assigned for certain benefits offered by one or more of the transaction cards in the user's profile (or discussion purposes only): an assigned weighting of 6 for a benefit linked to user-provided priority instruction such as an instruction indicating that maximal use of this card should be exercised until a date-based threshold; an assigned weighting of 5 for a benefit linked to a date-based threshold of at least 50,000 points if $3 k spent in 1st 3 months of credit card being activated; an assigned weighting of 4 for a benefit linked to at least 2.5% savings on certain types of purchases (e.g., gas purchases) or at certain merchants; an assigned weighting of 3 for a benefit linked to at least 2% savings on certain types of purchases or at certain merchants; an assigned weighting of 2 for a benefit linked to at least 1% savings (e.g., regardless of types of purchases or whether at any particular merchants); and an assigned weighting of 1 for a unique benefit that has a value which is not readily discernible by itself or relative to one or more other benefits. Such weighting, and/or adjustments thereto, may be provided and used in various manners (e.g., as discussed in connection with FIG. 6).

Any one or more of such assigned weightings may be overridden by certain user preferences or rules set up through the user's profile. For example, the user preferences or rules may be set up in the user's profile by way of a user interface to convey a series of questions or prompts (or by use of a template with entries to be populated by the user) through which the control engine solicits feedback from the user on how the card is to be used for certain types of purchases. For example, this may be implemented each time the user adds or registers a transaction card or account with the backend circuitry (or control engine).

In connection with the above and related example embodiments, the backend circuitry or control engine (e.g., as illustrated in connection with the control engine in FIGS. 2 and 4) may include a neural network classifier circuitry which trains the likely classification and/or correlation of purchase transactions relative to user-preferred choices (or habits) of transactions (e.g., as a function of one or more of venue of merchant/user, identity of merchant, type of goods/services, etc.) by adjusting weights associated with the purchase transactions to predict which transaction card (or transaction account) to recommend or select.

Consistent with the AI/ML aspects discussed above in connection with previously-illustrated and/or disclosed systems, other blocks illustrated in FIG. 6 may be used to edify the integrity of the transaction card/account selection to be made by the system. As examples: the database 601A may provide updates from the user regarding special circumstances for choosing one of the transaction cards in a particular timeframe, where the POS terminal is linked with a certain venue, merchant and/or merchant type, etc., and the database 601B may provide updated information regarding the user's habits and histories of transactions as discussed above (e.g., applicable to models to help the system intelligent select the appropriate one of the transaction cards for the current transaction).

Figure 7:
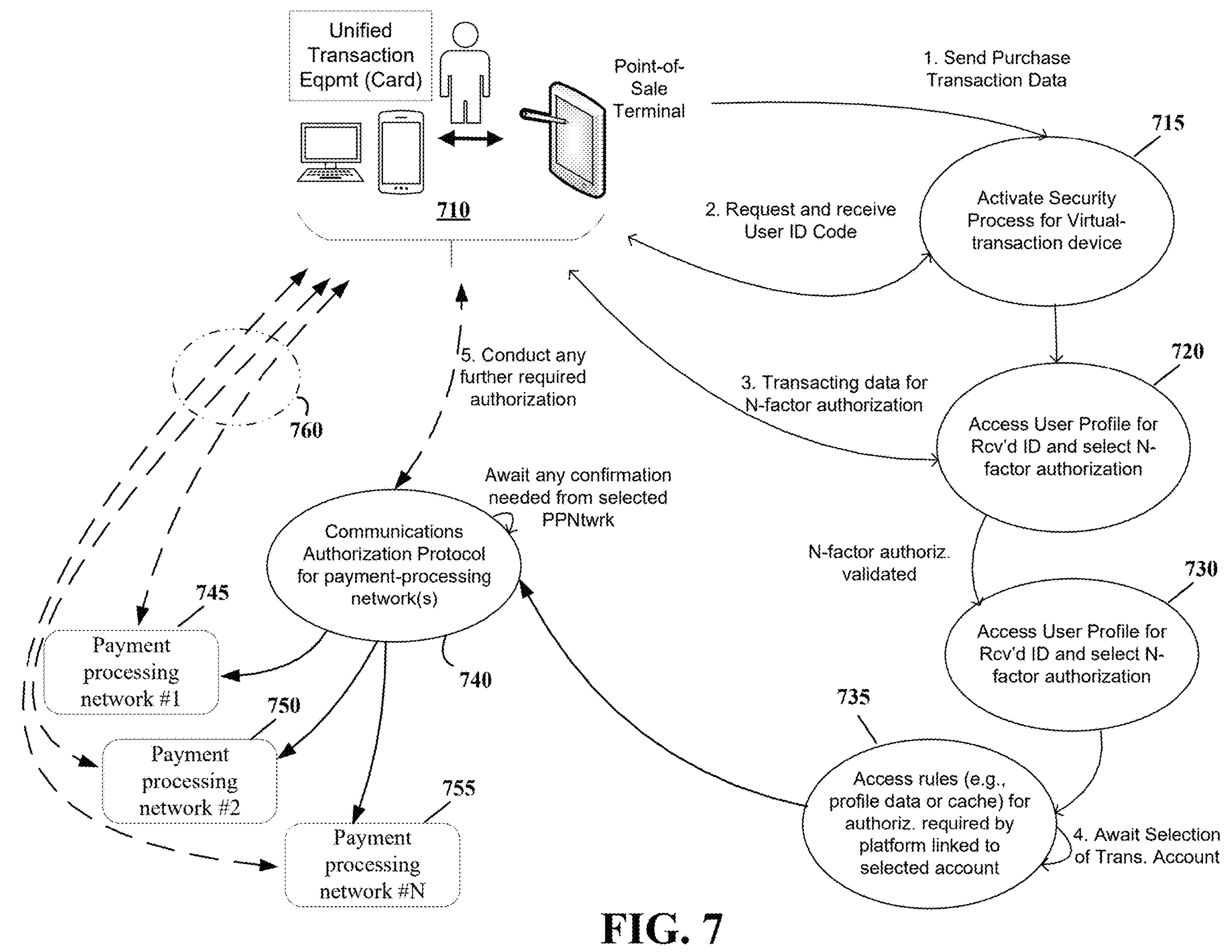
FIG. 7 is a flowchart illustrating various example protocols for carrying out secure communications and access involving transactions according to example embodiments also according to the present disclosure.

FIG. 7 is a flowchart illustrating various example protocols for carrying out secure communications and access involving transactions according to example embodiments also according to the present disclosure. In certain exemplary contexts, the purchase transaction environment 710 of FIG. 7 is similar to the purchase transaction environment 102 of FIG. 1, one of the purchase transaction environments of FIGS. 3A-3E, or the purchase transaction environment 460 of FIG. 4. Similarly, in certain exemplary contexts, the payment processing networks (sometimes "PPNtwk") 745, 750 and 755 of FIG. 7 are similar to the payment processing networks depicted in FIGS. 1-2, FIG. 4 or FIG. 5. Unique to the data flow shown in FIG. 7 are a set of communication channels 760 permitting the user's unified transaction equipment (e.g., smartphone, laptop, or credit card), and/or the POS terminal, to communicate directly with the payment processing network 745, 750 or 755 as selected by the system (e.g., as depicted in one of the previous figures) for selecting the rewards-based transaction card/account to complete the purchase transaction at the purchase transaction environment 710. Consider, for example, that the system is operated on behalf of a new bank (or other entity) that does not qualify (e.g., as providing sufficient security protocols) to select and process transactions on behalf of a user and one of the payment processing networks. In this example, the payment processing network may carry out (independent of separate communication protocols carried out by the system) whatever communications (as may be appropriate or required) with the POS terminal and/or a user interface (e.g., the user's smartphone) operable by the user at environment 710.

In addition to use of such communication channels 760, the system (e.g., operated on behalf of a bank or other entity) includes circuitry (e.g., such as the modules, engines, etc. as in FIGS. 1, 4 and 5) to carry out the activities shown as being related to steps 1 through 5 in connection with the actions depicted as action blocks 715, 720, 730, 735 and 740. After receiving the purchase transaction data at step 1 and in connection with step 2 and action block 715, the system sends a code to activate a secure communication for the unified transaction equipment (e.g., smart transaction card or simply "unified smartcard"). At action block 720, the system accesses the user profile for a user or smartcard ID received via the activated secure communication, and an n-factor authorization may be used as previously disclosed. At action block 730, the system confirms and approves that the n-factor authorization is correct and the system awaits the (suggested) selection and if applicable, the user's confirmation of the suggested selection. At action blocks 735 and 740 and in response to the selection of the rewards-based transaction card being confirmed by the user or otherwise final, the system accesses a profile associated with the bank or other entity, such as a profile identifying a communication protocol before finalizing the purchase transaction via the selected rewards-based transaction card, and then the system uses the communication protocol to process the transaction. At step 5 and associated with action block 740, the system may conduct any further required authorization with the user and/or with merchant (e.g., via the POS terminal) for finalizing the purchase transaction.

Unless otherwise indicated, the following terms are associated with the following examples, contexts and/or definitions: "POS terminal" is defined as a type of data-communications circuit (e.g., a retail-store card readers, various types of stationary and portable computing-processor equipment, and virtual software-configured logic circuits and systems) configured and enabled to process a transaction for the purchase of a good/service (i.e., offering) in exchange for consideration represented or conveyed by information linked to a purchase-transaction account (e.g., a rewards-type purchase-transaction account as disclosed herein). Further, in such contexts involving transactions through the use of rewards-type transaction accounts, "purchase" is typically associated with earning rewards currency and/or redeeming rewards (e.g., rewards redemptions) by using the rewards as the consideration (or as a currency for the transaction.

For further understanding, in certain examples, the Specification describes and/or illustrates aspects useful for implementing the claimed disclosure by way of various data-storage equipment (e.g., magnetic transaction cards, databases, memory circuits), data-processing equipment, data memory devices, and various circuits (or circuitry) which may be illustrated as or using terms such as blocks, modules, engine, device, system, unit, controller, and/or other circuit-type depictions (e.g., as with the block-directed reference numerals of each of the figures depicting a block, step, module, etc., as described herein). Such equipment and/or circuits may be used together with other aspects to exemplify how certain embodiments may be carried out in the form or structures, steps, functions, operations, activities, etc. As examples, wherein such equipment or circuitry may correspond to logic circuitry (e.g., which may refer to or include a code-programmed/configured CPU), the logic circuitry may carry out a process or method (sometimes "algorithm") by performing certain one or more disclosed steps or activities, and in another example, the logic circuitry may carry out a process or method by performing these same activities/operations along with one or more additional steps or activities. Yet another process or method in this context would be recognized in connection with the functions/activities associated with the set of blocks of FIG. 2, of any of FIGS. 3A-3E, of FIG. 7, and/or of any of the other systems disclosed (whether or not explicitly illustrated in the figures) in connection with exemplary aspects and data flow.

As further examples, in certain of the above-discussed embodiments, one or more modules are discrete logic circuits or programmable logic circuits may be configured for implementing these operations/activities, as may be carried out in the approaches shown in connection with the figures. In certain more-specific exemplary embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process (as described above) is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " refers to or includes "circuitry configured to convert . . . " and which may correspond to data-processing computer circuitry as in the given context indicated by the discussion). Further, in instances wherein the disclosure (including claims) refers to one aspect or item, it is understand that reference to one such item may be one among a plurality of items.

Other features, aspects, example embodiments, etc. of the present disclosure, which may be combined with aspects disclosed herein, are presented in U.S. Provisional Application No. 63/443,143 (USBC.018P1), which provisional application is incorporated by reference in its entirety.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of certain characterizations contemplated by the present disclosure.

What is claimed is:

1. A system comprising memory and one or more processors communicatively coupled to the memory, the one or more processors configured to:

receive transaction data for a prospective transaction associated with a unified electronic transaction device representing a plurality of reward-type transaction accounts for a user, wherein the unified electronic transaction device includes or is integrated with at least one of: a smart card, a personal computer, or a portable user device, and wherein the unified electronic transaction device includes distinct identification data and is enabled for conveying the distinct identification data to a POS equipment or terminal;

retrieve, from one or more databases and based on the transaction data, (i) rewards offerings data for each reward-type transaction account of the plurality of reward-type transaction accounts represented by the unified electronic transaction device and (ii) user data comprising (a) user-specific criteria for using each reward-type transaction account, (b) rewards-threshold goal for at least one of the plurality of reward-type transaction accounts;

input the rewards offerings data and the user data into an AI/ML model configured to predict an optimal reward-type transaction account for the prospective transaction from the plurality of reward-type transaction accounts at least in part by applying to the rewards offerings data for at least one reward-type transaction account of the plurality of reward-type transaction accounts (i) the user-specific criteria for the at least one reward-type transaction account and (ii) the rewards-threshold goal for at least one of the plurality of reward-type transaction accounts;

obtain from the AI/ML model the optimal reward-type transaction account for the prospective transaction;

validate authorization to proceed with the prospective transaction based on user-configurable data by using a first security procedure and a second security procedure different from the first security procedure and comprising multi-factor authentication, wherein the user-configurable data comprises a code maintained through the second security procedure, and wherein the second security procedure is controlled by an authorizer or issuer of the unified electronic transaction device, wherein the distinct identification data of the unified electronic transaction device is linked to the user data and used as part of the first security procedure or the second security procedure for the authorization;

responsive to validating authorization to proceed, generate data associated with the optimal reward-type transaction account and configured to cause processing of the prospective transaction;

transmit, over at least one communications network and to a computing entity, the data;

generate, for the AI/ML model and using a simulator, improvement suggestions related to use of the plurality of reward-type transaction accounts by simulating future transactions associated with the plurality of reward-type transaction accounts; and provide the improvement suggestions to the AI/ML model.

2. The system of claim 1, wherein the AI/ML model comprises an optimization algorithm configured to predict the optimal reward-type transaction account as a function of a rewards-maximization goal, and wherein the user-specific criteria comprises:

user-selected rewards-priority criteria for selection of one or more of the plurality of reward-type transaction accounts, and user-specific historical data indicative of one or more user-specific events corresponding to at least one of: a calendar linked or referring to the user, a reported travel of the user, and possible misuse of at least one of the plurality of reward-type transaction accounts.

3. The system of claim 1, wherein the AI/ML model is configured to predict the optimal reward-type transaction account to meet a user goal indicated in the one or more databases.

4. The system of claim 1, wherein the optimal reward-type transaction account maximizes or optimizes rewards across the plurality of reward-type transaction accounts.

5. The system of claim 1, wherein the optimal reward-type transaction account is predicted based at least in part on data, received from a POS terminal or equipment, indicating a type or category of the prospective transaction.

6. The system of claim 1, wherein the one or more processors are configured to receive confirmation data from a user-communication device linked to the optimal reward-type transaction account, before the data configured to cause processing of the prospective transaction is caused to be transmitted.

7. The system of claim 1, wherein the AI/ML model is configured to predict the optimal reward-type transaction account based on data, received from a POS equipment or terminal, indicating that a type of the prospective transaction corresponds to a type of transaction indicated in the user data as being a permitted type of transaction.

8. The system of claim 1, wherein the one or more processors are further configured to receive data from at least one third-party server to learn of rewards opportunities linked to at least one of the plurality of reward-type transaction accounts.

9. The system of claim 1, wherein the one or more processors are further configured to maintain the user data based on changes to the plurality of reward-type transaction accounts.

10. The system of claim 1, wherein the one or more processors are further configured to use access credentials to monitor use-related aspects of the plurality of reward-type transaction accounts.

11. The system of claim 1, wherein the data is transmitted in response to login credentials for use of the optimal reward-type transaction account.

12. The system of claim 11, wherein the transaction data includes identification authorization data for use with the unified electronic transaction device, and the one or more processors are configured to use the identification authorization data for the login credentials.

13. The system of claim 11, wherein the transaction data includes identification authorization data for use with the unified electronic transaction device that is distinct from the login credentials.

14. The system of claim 1, wherein the one or more processors are further configured to provide rewards-specific reporting information in response to a user query which is linked to authorization data indicated in the user data.

15. The system of claim 1, wherein the one or more processors are further configured to assess one or more additional rewards offerings for transaction accounts and in response, to recommend to the user, or an authorized entity as indicated in the user data, that a transaction account feature or transaction account that would have been best is not already among the plurality of reward-type transaction accounts.

16. A computer-implemented method comprising:

receiving, via a server and over at least one communications network, transaction data, for a prospective transaction associated with a unified electronic transaction device representing a plurality of reward-type transaction accounts for a user, wherein the unified electronic transaction device includes or is integrated with at least one of: a smart card, a personal computer, or a portable user device, and wherein the unified electronic transaction device includes distinct identification data and is enabled for conveying the distinct identification data to a POS equipment or terminal;

retrieving from one or more databases and based on the transaction data, (i) rewards offerings data for each reward-type transaction account of the plurality of reward-type transaction accounts represented by the unified electronic transaction device and (ii) user data comprising (a) user-specific criteria for using each reward-type transaction account, (b) rewards-threshold goal for at least one of the plurality of reward-type transaction accounts;

inputting the rewards offerings data and the user data into an AI/ML model configured to predict an optimal reward-type transaction account for the prospective transaction from the plurality of reward-type transaction accounts at least in part by applying to the rewards offerings data for at least one reward-type transaction account of the plurality of reward-type transaction accounts (i) the user-specific criteria for the at least one reward-type transaction account and (ii) the rewards-threshold goal for at least one of the plurality of reward-type transaction accounts;

obtaining from the AI/ML model the optimal reward-type transaction account for the prospective transaction;

validating authorization to proceed with the prospective transaction based on user-configurable data by using a first security procedure and a second security procedure different from the first security procedure and comprising multi-factor authentication, wherein the user-configurable data comprises a code maintained through the second security procedure, and wherein the second security procedure is controlled by an authorizer or issuer of the unified electronic transaction device, wherein the distinct identification data of the unified electronic transaction device is linked to the user data and used as part of the first security procedure or the second security procedure for the authorization;

responsive to validating authorization to proceed, generating data associated with the optimal reward-type transaction account and configured to cause processing of the prospective transaction;

transmitting, over at least one communications network and to a computing entity, the data;

generating, for the AI/ML model and using a simulator, improvement suggestions related to use of the plurality of reward-type transaction accounts by simulating future transactions associated with the plurality of reward-type transaction accounts; and providing the improvement suggestions to the AI/ML model.

17. The computer-implemented method of claim 16, further comprising:

optimizing and selecting, based at least in part on the improvement suggestions provided to the AI/ML model, a second optimal reward-type transaction account from the plurality of reward-type transaction accounts after processing of the prospective transaction, and effecting use of the second optimal reward-type transaction account in place of the optimal reward-type transaction account.

18. The computer-implemented method of claim 16, wherein the one or more databases store data linked to or stored with the user data to indicate user preferences with criteria for selecting certain reward-type transaction accounts of the plurality of reward-type transaction accounts to use for respective merchant offerings for different categories of transactions.

19. The computer-implemented method of claim 16, further including analyzing past transactions associated with the user for different reward-type transaction accounts of the plurality of reward-type transaction accounts and, in response, generating at least one suggestion for the user on how one or more of the plurality of reward-type transaction accounts could be or could have been improved by use of a different selection or by use of new or different transaction card.

20. A storage device including instructions which, in response to being executed by a computing processor circuit, causes a method to be performed, the method comprising:

receiving transaction data for a prospective transaction associated with a unified electronic transaction device representing a plurality of reward-type transaction accounts for a user, wherein the unified electronic transaction device includes or is integrated with at least one of: a smart card, a personal computer, or a portable user device, and wherein the unified electronic transaction device includes distinct identification data and is enabled for conveying the distinct identification data to a POS equipment or terminal;

retrieving from one or more databases and based on the transaction data, (i) rewards offerings data for each reward-type transaction account of the plurality of reward-type transaction accounts represented by the unified electronic transaction device and (ii) user data comprising (a) user-specific criteria for using each reward-type transaction account, (b) rewards-threshold goal for at least one of the plurality of reward-type transaction accounts;

inputting the rewards offerings data and the user data into an AI/ML model configured to predict an optimal reward-type transaction account for the prospective transaction from the plurality of reward-type transaction accounts at least in part by applying to the rewards offerings data for at least one reward-type transaction account of the plurality of reward-type transaction accounts (i) the user-specific criteria for the at least one reward-type transaction account and (ii) the rewards-threshold goal for at least one of the plurality of reward-type transaction accounts;

obtaining, from the AI/ML model, the optimal reward-type transaction account for the prospective transaction;

validating authorization to proceed with the prospective transaction based on user-configurable data by using a first security procedure and a second security procedure different from the first security procedure and comprising multi-factor authentication, wherein the user-configurable data comprises a code maintained through the second security procedure, and wherein the second security procedure is controlled by an authorizer or issuer of the unified electronic transaction device, wherein the distinct identification data of the unified electronic transaction device is linked to the user data and used as part of the first security procedure or the second security procedure for the authorization;

responsive to validating authorization to proceed, generating data associated with the optimal reward-type transaction account and configured to cause processing of the prospective transaction;

transmitting, over at least one communications network and to a computing entity, the data;

generating, for the AI/ML model and using a simulator, improvement suggestions related to use of the plurality of reward-type transaction accounts by simulating future transactions associated with the plurality of reward-type transaction accounts; and providing the improvement suggestions to the AI/ML model.

21. The system of claim 1, wherein the code is manipulated through the second security procedure by an authorizer or issuer of the unified electronic transaction device, the second security procedure to be used to complement the first security procedure for mitigating or preventing an unauthorized purchase involving use of the unified electronic transaction device for a transaction amount over a threshold specified via user data.

22. The system of claim 1, wherein the code is manipulated through use of the second security procedure by an authorizer or issuer of the unified electronic transaction device, and the second security procedure is to be used to complement the first security procedure specific to use of the unified electronic transaction device for a certain category of merchant offering.

23. The system of claim 1, wherein the one or more processors are further configured to:

assess, after the data is transmitted over the at least one communications network, whether a different reward-type transaction account of the plurality of reward-type transaction accounts would facilitate a rewards-maximization goal, and cause return of a merchant offering, linked to proposed transaction completed via the optimal reward-type transaction account, and cause reprocessing of the prospective transaction via a different reward-type transaction account of the plurality of reward-type transaction accounts.

24. The computer-implemented method of claim 16, wherein the code is to be used for mitigating or preventing an unauthorized purchase through use of the unified electronic transaction device.

25. The computer-implemented method of claim 16, wherein the code is to be used for mitigating or preventing an unauthorized purchase involving a certain category of merchant offering.

26. The computer-implemented method of claim 16, wherein the code is to be used to complement the first security procedure for mitigating or preventing an unauthorized transaction involving an amount over a threshold specified via the user data.

27. The computer-implemented method of claim 16, wherein the plurality of reward-type transaction accounts is indicated by an association of data in the user data and the transaction data.

28. The computer-implemented method of claim 16, wherein the second security procedure comprises:

transmitting the code from a computing device associated with the authorizer or issuer of the unified electronic transaction device to a user-communication device to receive by the computing device the code or a variation of the code from the user-communication device; and verifying the second security procedure compliance with the computing device.

29. The computer-implemented method of claim 28, wherein the code is a random code.

30. The computer-implemented method of claim 16, wherein the code is a user designated code stored in a user profile and is updated periodically by the user via one or more secure communication channels associated with the authorizer or issuer of the unified electronic transaction device.

31. The computer-implemented method of claim 16, further comprising determining the first security procedure and the second security procedure from a plurality of security procedures based on a profile associated with a processing network corresponding to the optimal reward-type transaction account.

32. The computer-implemented method of claim 16, further comprising determining the first security procedure and the second security procedure from a plurality of security procedures based on a user profile associated with the user.

* * * * *